US008271345B1

(12) United States Patent
Milgrom et al.

(10) Patent No.: US 8,271,345 B1
(45) Date of Patent: Sep. 18, 2012

(54) SYSTEMS AND METHOD FOR INCORPORATING BIDDER BUDGETS IN MULTI-ITEM AUCTIONS

(75) Inventors: Paul R. Milgrom, Stanford, CA (US); Steve Goldband, Palo Alto, CA (US)

(73) Assignee: Auctionomics Inc., Palo Alto, CA (US)

( * ) Notice: Subject to any disclaimer, the term of this patent is extended or adjusted under 35 U.S.C. 154(b) by 0 days.

(21) Appl. No.: 12/796,552

(22) Filed: Jun. 8, 2010

Related U.S. Application Data

(63) Continuation-in-part of application No. 12/340,999, filed on Dec. 22, 2008.

(60) Provisional application No. 61/185,099, filed on Jun. 8, 2009.

(51) Int. Cl.
*G06Q 30/00* (2012.01)
*G06F 17/30* (2006.01)

(52) U.S. Cl. ...................... 705/26.1; 705/27.1; 705/26.3

(58) Field of Classification Search ......... 705/26.1–27.2
See application file for complete search history.

(56) References Cited

U.S. PATENT DOCUMENTS 6,408,283 B1 6/2002 Alaia et al.
6,499,018 B1 12/2002 Alaia et al.
6,564,192 B1 5/2003 Kinney, Jr. et al.
7,152,043 B2 * 12/2006 Alaia et al. ...................... 705/37
7,283,980 B2 * 10/2007 Alaia et al. ...................... 705/37
7,337,139 B1 * 2/2008 Ausubel .......................... 705/37
7,558,746 B2 * 7/2009 Alaia et al. ................... 705/26.3
7,571,137 B2 * 8/2009 Alaia et al. ...................... 705/37
7,742,971 B2 * 6/2010 Sandholm et al. .............. 705/37
2001/0037285 A1 * 11/2001 Alaia et al. ...................... 705/37
2002/0065760 A1 * 5/2002 Wiesehuegel et al. .......... 705/37
2002/0128948 A1 * 9/2002 Wiesehuegel et al. .......... 705/37
2002/0169708 A1 * 11/2002 Chittenden ..................... 705/37
2003/0018560 A1 * 1/2003 Dietrich .......................... 705/37
2003/0236734 A1 * 12/2003 Guler et al. ..................... 705/37
2004/0054551 A1 * 3/2004 Ausubel et al. ................... 705/1
2005/0273417 A1 * 12/2005 Budish ............................ 705/37
2006/0069635 A1 * 3/2006 Ram et al. ....................... 705/37
2006/0095363 A1 * 5/2006 May ............................... 705/37
2006/0277135 A1 * 12/2006 Jain et al. ........................ 705/37
2007/0083457 A1 * 4/2007 Evelyn et al. ................... 705/37
2007/0100738 A1 * 5/2007 Mullendore .................... 705/37
2007/0156575 A1 * 7/2007 Sandholm et al. .............. 705/37
2007/0288350 A1 * 12/2007 Bykowsky ...................... 705/37

(Continued)

OTHER PUBLICATIONS

"Budget-constrained sequential auctions with incomplete information." Carolyn Pitchik. Games and Economic Behavior. Nov. 28, 2006. 66. 928-949. [recovered from ProQuest May 6, 2012].*

(Continued)

*Primary Examiner* — William Allen
*Assistant Examiner* — Kathleen G Palavecino
(74) *Attorney, Agent, or Firm* — Patent Law Works LLP

(57) ABSTRACT

Systems and methods for conducting multi-item auctions for complex goods that allows bidders to specify budget constraints is disclosed. The system includes a server, a network, a plurality of trader systems and a data store unit. The system allows bidders to work effectively with limited budgets. The server includes an allocation unit performs a sealed-bid auction that enables bidding without the risk of going over budget, and thus, the present invention encourages bidders to place more and higher bids. Sellers will therefore receive higher prices and goods are more likely to be efficiently assigned.

19 Claims, 13 Drawing Sheets

U.S. PATENT DOCUMENTS

| | | | | |
|---|---|---|---|---|
| 2008/0027851 | A1* | 1/2008 | Brady et al. | 705/37 |
| 2008/0071672 | A1* | 3/2008 | Rupp et al. | 705/37 |
| 2008/0133398 | A1* | 6/2008 | Kinney et al. | 705/37 |
| 2008/0162328 | A1* | 7/2008 | Conitzer et al. | 705/37 |
| 2008/0228595 | A1* | 9/2008 | Hill et al. | 705/27 |
| 2009/0234710 | A1* | 9/2009 | Belgaied Hassine et al. | 705/10 |

OTHER PUBLICATIONS

Cramton, P., “Colombia’s Forward Energy Market,” Working Paper, University of Maryland, Aug. 28, 2007, pp. 1-64.

Cramton, P., “Comments on the RGGI Market Design,” Submitted to RGGI, Inc. By ISO New England and NYISO, Nov. 15, 2007, pp. 1-28.

Klemperer, P., “A New Auction for Substitutes: Central Bank Liquidity Auctions, the U.S. TARP, and Variable Product-Mix Auctions,” Dec. 2008??, [Online] [Retrieved on Mar. 16, 2009], Most Recent Public Version Available at <URL:http://www.paulklemperer.org>, Retrieved from the Internet at <URL:http://www.nuff.ox.ac.uk/users/klemperer/substsauc_NonConfidentialVersion.pdf>.

* cited by examiner

SYSTEMS AND METHOD FOR INCORPORATING BIDDER BUDGETS IN MULTI-ITEM AUCTIONS

CROSS REFERENCE TO RELATED APPLICATIONS

The present application claims the benefit of priority under 35 U.S.C. §119(e) of U.S. Provisional Application Ser. No. 61/185,099 entitled "Incorporating Bidder Budgets In Multi-Item Auctions," filed on Jun. 8, 2009 by Paul R. Milgrom, the entire contents of which are incorporated by reference herein. This application is also a continuation in part under 35 U.S.C. §120 of U.S. patent application Ser. No. 12/340,999 entitled "Assignment Exchange and Auction," filed on Dec. 22, 2008 by Paul R. Milgrom.

BACKGROUND OF THE INVENTION

1. Field of the Invention

The present invention relates to on-line systems and methods for conducting auctions. More particularly, the present invention relates to on-line systems and methods for incorporating information about bidder budgets in multi-item sealed-bid auctions.

2. Description of the Related Art

There has recently been significant growth in the importance of dynamic pricing to market goods of many kinds. At the low end, eBay has clearly established the value of auctions for consumers to buy and sell individual items on the Internet. EBay has made important advances in many areas, including highly effective search, reputation and payment systems, dispute resolution and fraud prevention process, and others. Their auction design itself, however, remains unremarkable but effective, since most of the goods for sale are marketed one at a time. Auctions are conducted with a fixed deadline, and ascending bids are taken up to the deadline. A proxy bidder is available, and a particular variant, a Dutch auction design, is available for the small subset of items in which multiples units are available.

At the other extreme, auctions have been used effectively by the US and others to sell radio spectrum licenses, mineral rights and more, by financial houses to sell shares in firms and other investment instruments, and by web firms, most successfully Google, to sell advertisement space. Such auctions transact billions of dollars, often in highly complex, integrated and orchestrated events. The auctions are designed with the help of costly consultants, who write specialized rules to accommodate technical, regulatory and even political requirements. Bidders may also engage consultants to advise them on bid strategy. Personnel are assigned by both sides to full-time engagement during the auction events, which may involve weeks of effort. The auctioneer and their consultants train the bidders and maintain a 'war room' facility to manage the process. In the case of web ads, auctions are run in real-time and are exquisitely integrated with the ad delivery systems. Competition to provide services in these high-end auctions is intense.

Yet there are many market settings where auctions are not used because the methods just described are too costly. Nevertheless, these markets require the expression of business needs just like the larger ones, and have multiple goods for sale that can be substitutes or complements, or important business rules like constraints. Thus, there is a middle tier of governments and businesses that are not able to run efficient and effective auctions. In particular, there is a need for a radically lower cost and complexity of implementation for on-line auctions.

In multi-item auctions, budgetary limits can significantly limit a bidder's options: bidders often cannot risk outcomes where they may be required to pay more than their authorized budgets. Although important in many areas including online ad placement, an immediate need exists for auctions of heterogeneous physical goods, contracts, and financial instruments, where budget limits are important and existing auctions' failure to account for that reduce the number and level of bids. For example, in sales of oil and gas rights by the United States Department of the Interior, the average number of bids has been only 1.3 per tract, with losing bidders unable to compete for many tracts due to their need to limit budget exposure. Similarly, recent auctions of mortgage-backed securities have low participation, and buyers are interested in limiting their spending on various types of securities to limit or manage the risks they bear.

Multi-item auction design has been at the frontier of research in economics and computer science, and several new designs have been proposed. Yet none of the new designs enables effective competition in auctions when participants are faced with serious budget constraints and must limit the cost of items acquired. The addition of budget constraints to auctions that exist in the prior art poses a number of problems. One is a problem of computation, which arises because finding auction outcomes can require finding solutions to packing problems. A second problem concerns incentives: the new mechanisms must be thoroughly analyzed to verify that they do not enable collusive behavior or undesirable equilibrium outcomes. While extending simple auctions appears to be straightforward, a third problem involves extending the rules of more complex auctions, such as core-selecting combinatorial auctions.

SUMMARY OF THE INVENTION

The present invention overcomes the deficiencies of the prior art with systems and methods for conducting multi-item auctions for complex goods that allows bidders to specify budgets that are respected by the auction system, even when the sum of individual bids exceeds the budget. By creating new sealed-bid systems and methods that enable bidding without the risk of going over budget, the present invention encourages bidders to place more and higher bids. Sellers will therefore receive higher prices and goods are more likely to be efficiently assigned. In particular, the present invention promotes more efficient auction outcomes and, when overall competition is thin, higher revenues.

The multi-item auction system that incorporates bidder budgets, called a "budget-augmented assignment exchange and auction system," comprises a server, a network, a plurality of trader systems or a system to import bids, and a data store unit. The trader systems are coupled by the network to the server. The server performs the auction or exchange, receives or imports assignment messages or budget messages, creates report messages, and retrieves and stores data sets to and from the data storage unit. The assignment messages allow the users to include budget constraints that apply to a plurality of bids on multiple items. The server comprises an interface module for receiving and sending messages and reporting results to bidders and administrators, a system for alternatively importing messages and exporting results, an auction module and/or an exchange module, and an allocation system. The allocation system determines an allocation of lots that maximizes a total money value for a plurality of bid groups subject to one or more constraints. The server also cooperates with the plurality of trader systems to present user interfaces for entering bids and bid groups, entering constraints for the bids and bid groups, and show the results of an auction or exchange, or with external systems to exchange information about the auction and receive messages. The present invention also includes a method for assigning, pricing or exchanging multiple types of lots comprising the steps of: receiving a first bid group from a first bidder; receiving a total effective quantity constraint and/or a budget constraint for the first bid group; receiving a second bid group from a second bidder, determining an allocation of lots that awards bids to the first bidder and the second bidder, wherein the allocation maximizes, subject to the received constraints, a first total money value of awarded bids to the first bidder and a second total money value of awarded bids to the second bidder; and notifying the first bidder and the second bidder of the allocation.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1A:
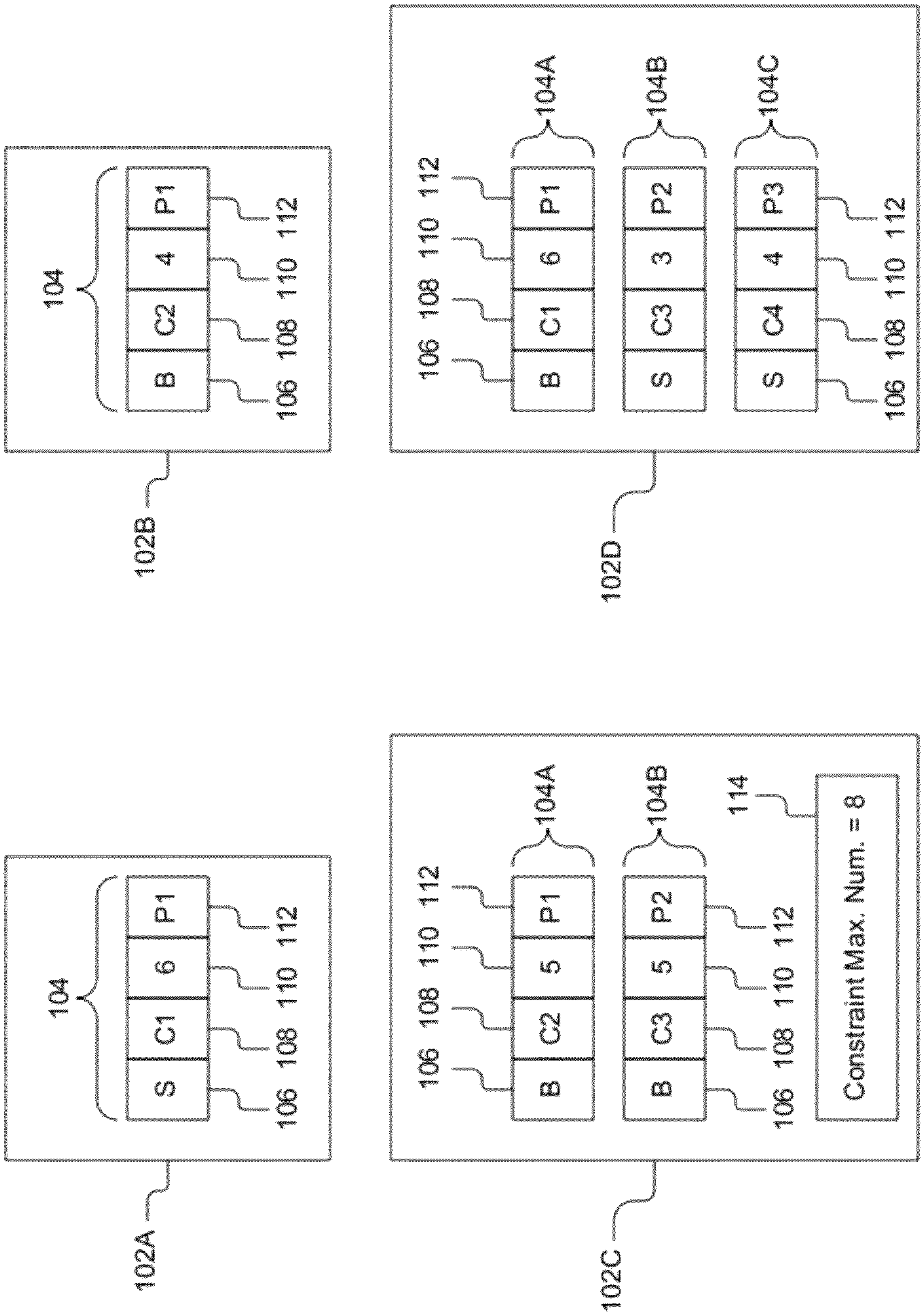
FIGS. 1A, 1B, 1C and 1D are block diagrams of embodiments for data structures and data of a multi-item auction system that incorporates bidder budgets in accordance with the present invention.

Systems and methods for incorporating bidder budgets in multi-item auctions are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to specific auctions. However, the present invention applies to any type of computing system and data processing for implementing an exchange or auction.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including Internet-resident 'cloud' storage, hard drives, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language or data storage system. It will be appreciated that a variety of programming languages or data storage systems may be used to implement the teachings of the invention as described herein.

System Overview

The present invention operates as a direct mechanism that is compact, easy to implement, optionally respects integer constraints and is a "tight" simplification of a standard direct competitive mechanism. In one embodiment, the present invention also operates in two or more stages to allow final reports to be informed by earlier reported information or by summary reports based on that information. The system and method of the present invention establish connections between the assignment auction and exchange and the Vickrey auction and exchange, the uniform price auction and exchange for a single type of product, and an ascending or descending multi-product clock auction.

The present invention, called a "budget-augmented assignment exchange and auction" system, is a mechanism for use in assigning and pricing multiple goods or varieties of a good. In one embodiment, the budget-augmented assignment exchange and auction system of the present invention is a multi-item auction system that incorporates bidder budgets. Still more particularly, the present invention is a sealed bid auction with an expanded message space to allow for budget constraints. While the present invention is described below in the context of goods, those skilled in the art will recognize that the system and method of the present invention can be used for services, rights or any other exchangeable item. Simplification is at the core of much of practical market design. In many real applications, the direct mechanisms studied in much of economic theory are far too complex to be useful. The "budget-augmented assignment exchange and auction" system applies to settings in which there are a certain number of varieties of a good (for example, including but not limited to electric power) that are offered for sale.

The budget-augmented assignment exchange and auction system of the present invention is particularly advantageous because it provides a mechanism that accommodates substitution of and among goods or lots. When different versions of a good are substitutable at all for a particular user, the rate of substitution is frequently one-for-one, or nearly so. For example, a cement purchaser may wish to buy some quantity of cement and may be prepared to pay more to a supplier located closer to the point of use, but the number of tons needed may still be fixed independently of the source: substitution is one-for-one. A northern California electric utility may purchase power at the Oregon border or from southern California, subject to transmission constraints on each. Or, a cereal maker may be able to substitute bushels of grain today for bushels tomorrow by storing the grain in a suitable facility or one type of grain for another up to limits imposed by product specifications. These are all examples of substitution by buyers, but a similar structure is found among sellers, as when a manufacturer can deliver several versions of the same processed good. In each case, substitution possibilities are typically limited, but when substitution is possible at all, it involves at least approximately one-for-one substitution among various versions of a good. This property of one-for-one substitution, combined with integer demands and/or supplies, ensures that there exists an efficient solution with integer allocations. The budget-augmented assignment exchange and auction system of the present invention takes advantage of the one-for-one substitution possibility whenever that is available and outputs integer allocations. This is an important property. Many commodities are most efficiently shipped by the truckload or container-load, and even divisible resources such as electrical power may be sold in whole numbers of megawatts. Even when integer constraints are not logically necessary, common practice may make them useful: a practical resource allocation mechanism must be able to respect such integer constraints.

Figure 1B:
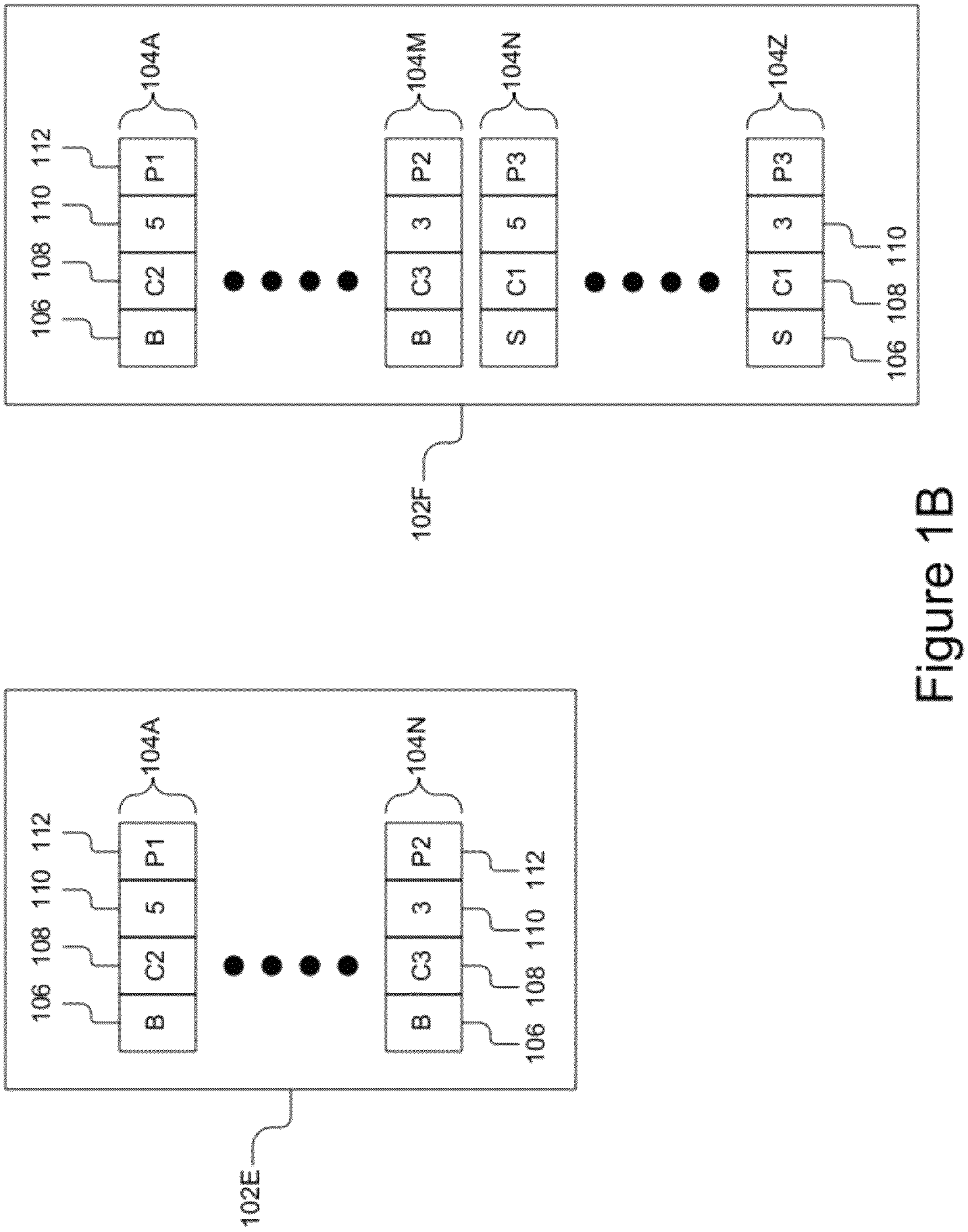
Figure 2:
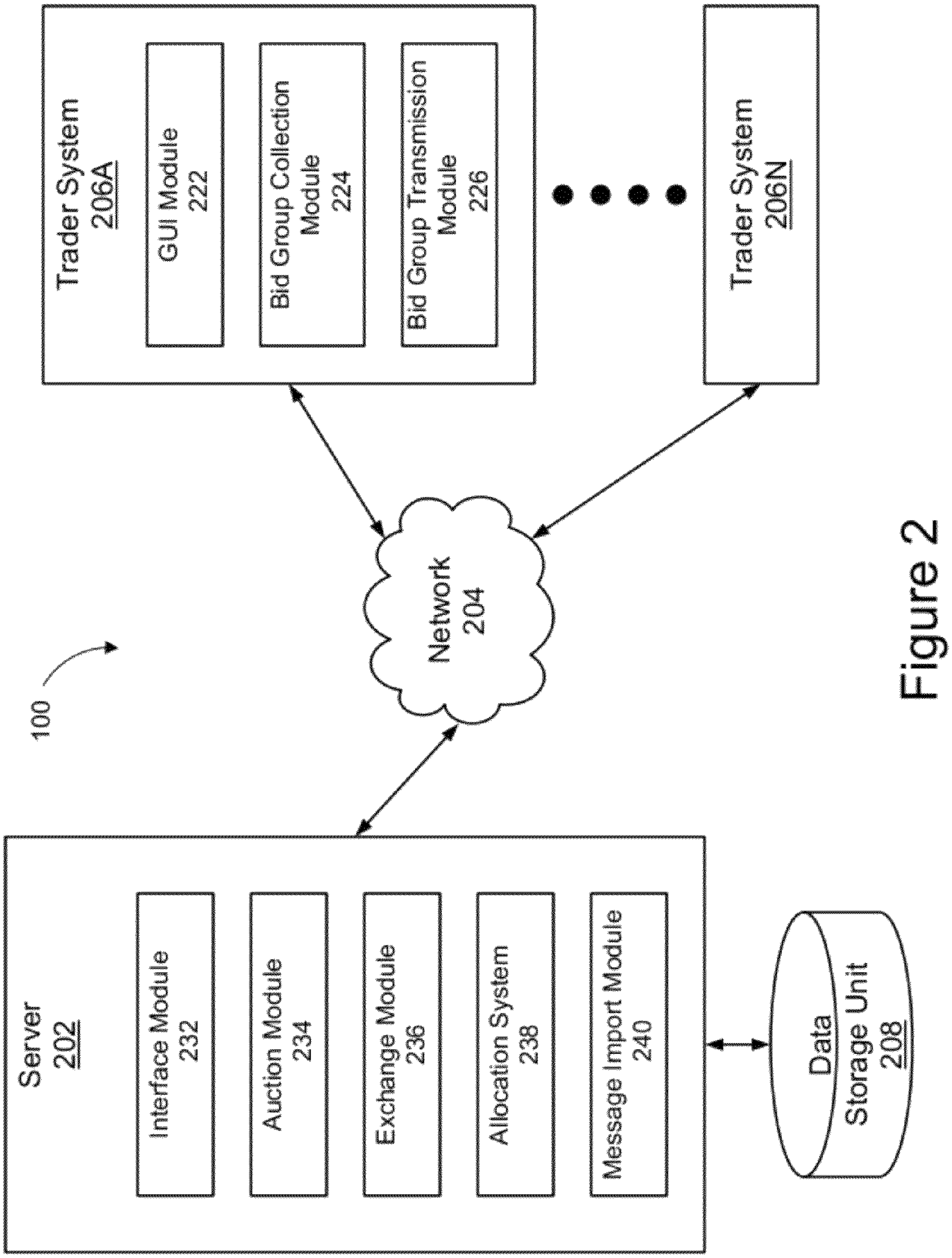
FIG. 2 is a block diagram of an embodiment of the multi-item auction system that incorporates bidder budgets in accordance with the present invention.

FIGS. 1A and 1B show one embodiment of example data structures and data for a budget-augmented assignment exchange and auction system 100 (See FIG. 2). In this example, one or more sellers are offering or one or more buyers are bidding on three substitute lots, more particularly, commodities C1, C2, and C3. Throughout the description below of the present invention, the term "lot" will be used to denote the unit being exchanged or purchased or priced. Those skilled in the art will recognize that a lot may be an item, a good, a service, a good and a service, a product, a collection of goods, a collection of services, a collection of goods and a collection of services, a right, or any other combinations of the previous. The system 100 operates on two or more bid groups 102A-102F. A bid group 102A-102F includes one or more bids 104. In one embodiment, the bid group 102A-102F also includes a constraint, such as a maximum total number of lots for the bid group 102A-102F. A bid 104 includes a first field 106 for indicating or specifying whether the bid is to sell or to buy, a second field 108 for specifying a type of lot, a third field 110 specifying a maximum number of lots of the type specified in the second field 108, and a fourth field 112 specifying a money value per lot. FIGS. 1A and 1B show seven example bid groups 102A-102F demonstrating the different types of bid 104 that may be included within a bid group 102A-102F.

A first embodiment of a bid group 102A shows the simplest configuration for a bid group 102A-102F. The first embodiment of the bid group 102A has a single bid 104. The single bid 104 has the structure described above and includes the first through fourth fields 106, 108, 110 and 112. For example, the bid 104 is a bid to sell six lots of commodity C1 at price P1. The first embodiment of the bid group 102A illustrates that a bid group can include only a single bid to sell.

A second embodiment of a bid group 102B shows another simple configuration for a bid group 102A-102F. A second embodiment of the bid group 102B again has a single bid 104. The single bid 104 has the structure described above and includes the first through fourth fields 106, 108, 110 and 112. For example, the bid 104 is a bid to buy four lots of commodity C2 at price P1. The second embodiment of the bid group 102B illustrates that a big group can include only a single bid to buy.

A third embodiment of a bid group 102C shows another configuration for a bid group in which there are a plurality of bids 104A, 104B that are subject to a total effective quantity constraint 114. Again, each of the plurality of bids 104A, 104B has the structure described above and includes the first through fourth fields 106, 108, 110 and 112. For example, a first bid 104A of the bid group 102C is a bid to buy five lots of commodity C1 at price P1 and the second in 104B of the bid group 102C is a bid to buy five lots of commodity C3 at price P2. Both of these bids 104A, 104B are subject to constraint 114 that specifies that the total number of units may not exceed eight. In other words, the constraint 114 implements a mutually exclusive such that the maximum number of lots of C2 and C3 is at most eight (8=5+5−2). Those skilled in the art will recognize that while only two bids to buy 104A, 104B are shown in bid group 102C, other configurations of bid groups could apply a mutually exclusive or constraint to bids to sell, or a combination of bids to buy and sell including any number of bids to sell and buy. In some cases, the first field could be eliminated and the bids 104 expressed as a vector, essentially in the same format as a bid, but with negative quantities expressing an offer for sale rather than an offer to buy. In some cases, the same commodity may appear in multiple bids in a single group, thereby to describe a single-product supply function or a single-product demand function.

A fourth embodiment a bid group 102D shows that the bid group 102D can include a plurality of bids 104A, 104B and 104C that implement a swap. In other words, the plurality of bids 104A, 104B and 104C need not be of the same type (all bids to buy or all bids to sell), and in fact, at least one of the bids in a swap bid group must be a bid to sell and a second of the bids must be a bid to buy. Again, each of the plurality of bids 104A, 104B and 104C has the structure described above and includes the first through fourth fields 106, 108, 110 and 112. For example, a first bid 104A of the bid group 102D is a bid to buy six lots of commodity C1 at price P1; the second bid 104B of the bid group 102D is a bid to sell three lots of commodity C3 at price P2; and the third bid 104C of the bid group 102D is a bid to sell four lots of commodity C4 at price P3. While the example bid group 102D only shows a single bid 104A to buy, those skilled in the art will recognize that bid group 102D is swap and can include a plurality of bids to sell and a plurality of bids to buy.

Referring now to FIG. 1B, a fifth embodiment a bid group 102E shows that the bid group 102E includes a plurality of bids 104A-104N. This embodiment is similar to that of bid group 102A, except that there are a plurality of bids 104A-104N to buy. Each of the plurality of bids 104A-104N has the structure described above and includes the first through fourth fields 106, 108, 110 and 112. While bid group 102E shows the bids as being bids to buy, those skilled in the art will recognize that they could alternatively be bids to sell.

A sixth embodiment a bid group 102F shows that the bid group 102F as including a plurality of bids 104A-104M, 104N-104Z. Each of the plurality of bids 104A-104M, 104N-104Z has the structure described above and includes the first through fourth fields 106, 108, 110 and 112. In this embodiment, however, the bid group 102F includes both a plurality of bids 104A-104M to buy and a plurality of bids 104A-104M to sell. It should be noted that each of the bids 104A-104M, 104N-104Z can also specify a different commodity, a different number of lots, and a different price.

Figure 1C:
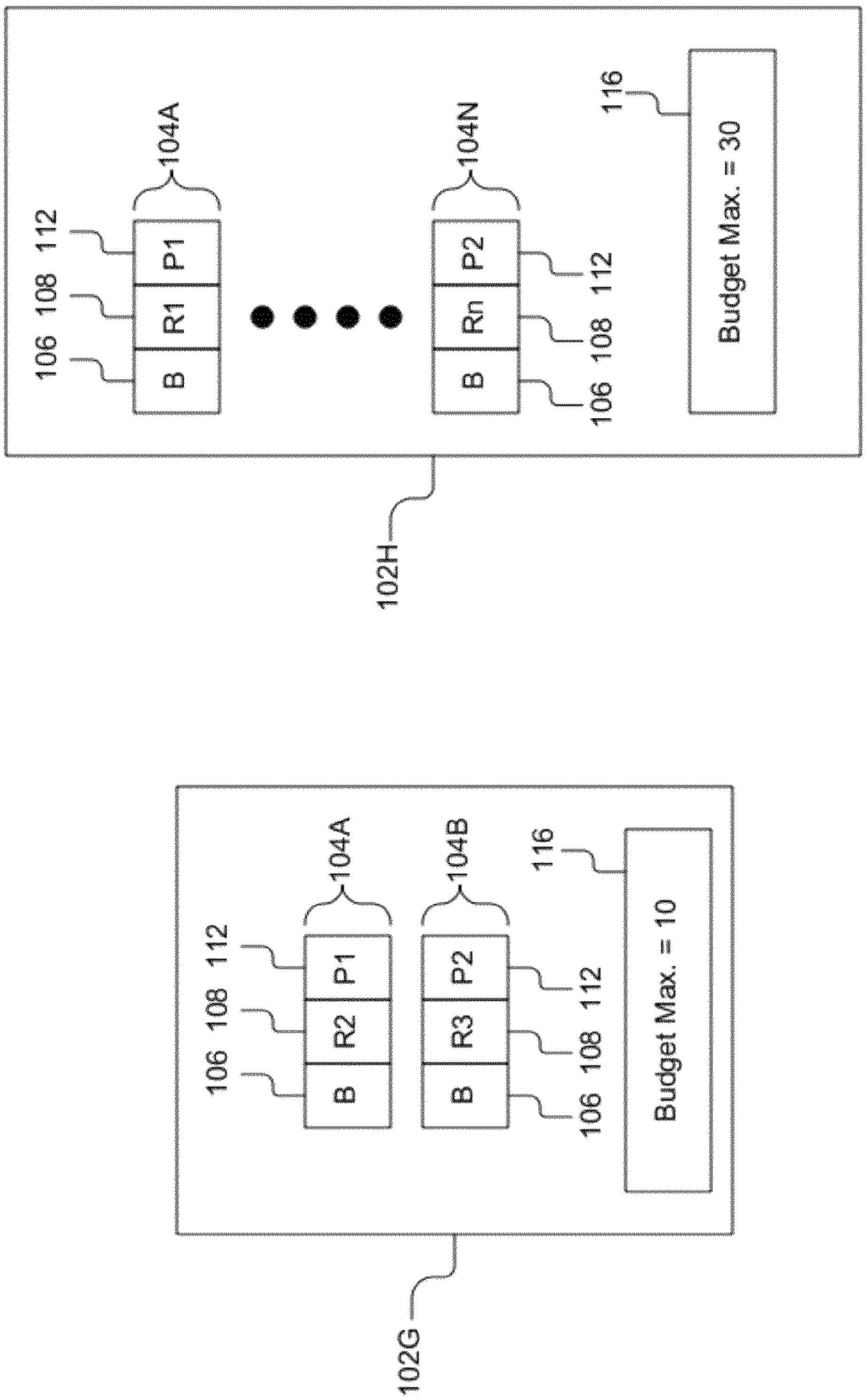

FIG. 1C shows one embodiment of example data structures where the budget-augmented assignment exchange and auction system 100 (See FIG. 2) is a sealed bid auction with an expanded message space to allow for budget constrained bids. In this example, one or more buyers are bidding on three different lots, more particularly, rights R1, R2, and R3 such as mineral rights, oil and gas rights or spectrum rights. Those skilled in the art will recognize that a lot may be a right as opposed or in addition to an item, a good, a service, a good and a service, a product, a collection of goods, a collection of services, a collection of goods and a collection of services, or any other combinations of the previous. The bid group 102G includes two or more bids 104A, 104B. A bid 104 includes a first field 106 for indicating or specifying a buyer, a second field 108 for specifying a type of lot, and a third field 112 specifying a maximum total money value that may be spent for the bid. The bid group 102G also includes a constraint 116, such as an overall budget or maximum price that the bidder will pay for all bids 104A, 104B in the group 102G. For example, a first bid 104A of the bid group 102G is a bid to buy right R2 at price P1 and the second bid 104B of the bid group 102G is a bid to buy right R3 at price P2. Both of these bids 104A, 104B are subject to constraint 116 that specifies a total overall budget spend for all bids that may not exceed 10. In other words, the constraint 116 requires that the maximum price can be 10 spent by this bid group whether it be for both lots, R2 or R3 and is a separate condition from the price for a given lot 104A, 104B being below its respective price P1, P2. Those skilled in the art will recognize that while only two bids 104A, 104B are shown in bid group 102G, other configurations of bid groups could apply a mutually exclusive or constraint to any number of bids greater than one. In some cases, the first field 106 could be eliminated as the bids 104 are all bids to buy.

Yet another embodiment of a bid group 102H shows that the bid group 102H includes a plurality of bids 104A-104N. This embodiment is similar to that of bid group 102G, except that there is a plurality of buy bids 104A-104N. Each of the plurality of bids 104A-104N has the structure described above and includes the fields 106, 108 and 112. The bid group 102H shows that the overall budget constraint 116 in this example is 30 and can apply to n number of bids 104*a*-104*n* where n is 3 or more.

Figure 1D:
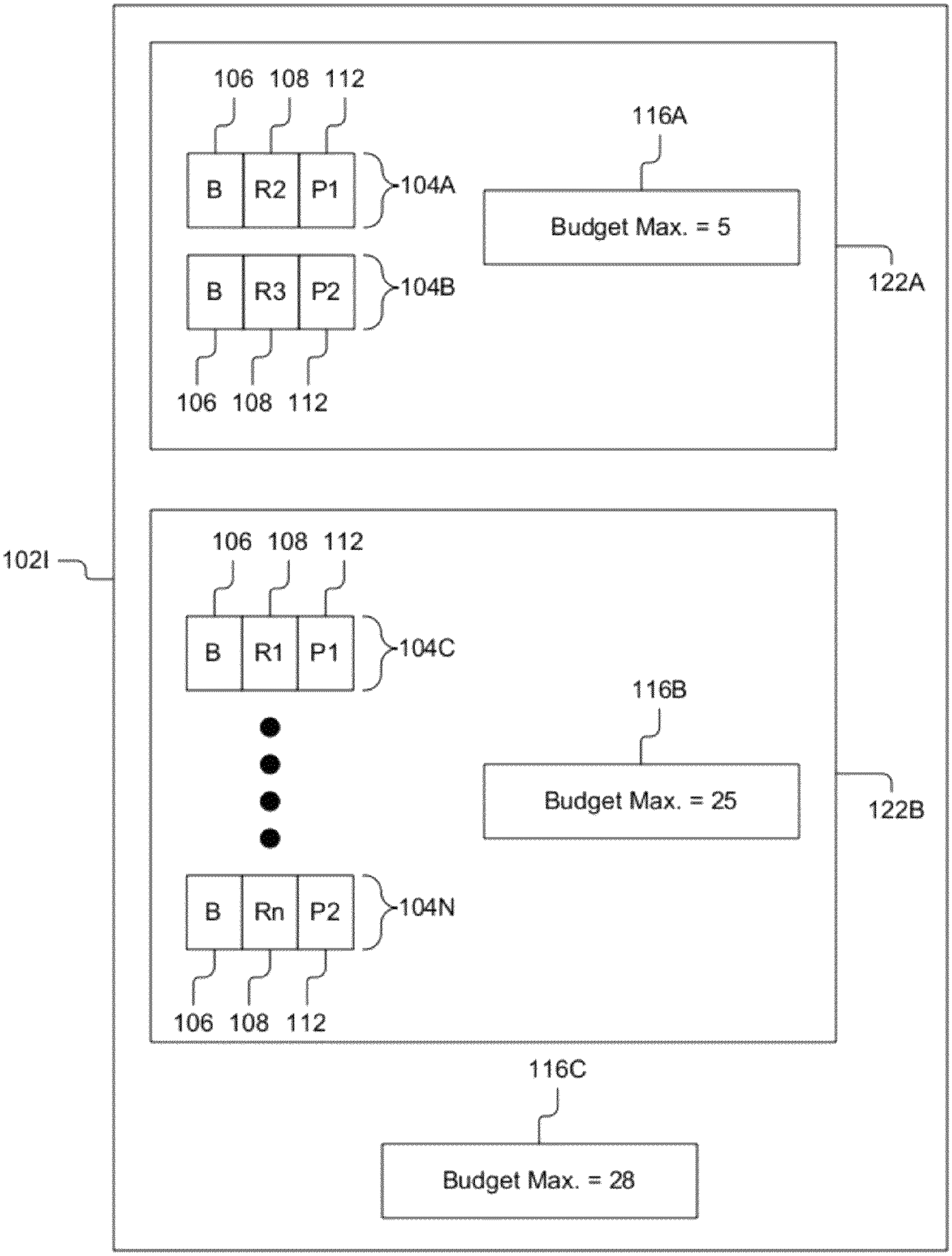

A ninth embodiment of a bid group 102I is shown FIG. 1D. The ninth embodiment of the bid group 102I shows that a bid group 102I may include one or more subgroups 122A, 122B and that a bid group may have a plurality of budget constraints 116A, 116B and 116C. As shown in FIG. 1D, the bid group 102I comprises a first subgroup 122A and the second subgroup 122B. The first subgroup 122A is similar to bid group 102G, and includes two bids 104A, 104B. Each bid 104A, 104B includes a first field 106 for indicating or specifying a buyer, a second field 108 for specifying a type of lot, and a third field 112 specifying a maximum total money value that may be spent for the bid 104A, 104B. The first subgroup 122A also includes a budget constraint 116A, such as a budget or maximum price that the bidder will pay for bids 104A, 104B in the first subgroup 122A. For example, subgroup 122A has a budget constraint 116 that specifies a total overall budget spend for all bids (bid 104A and bid 104B) that may not exceed five. The bid group 102I also has a second subgroup 122B that is similar to bid group 102H described above. The second subgroup 122B includes a plurality of bids 104C-104N. Each of the plurality of bids 104C-104N has the structure described above and includes the fields 106, 108 and 112. The second subgroup 122B has a budget constraint 116B that requires that the total money spent for bids 104C-104N, not exceed the example value here of 25. In addition, the bid group 102I has a third overall budget constraint 116C that requires that all bids, both those in the first subgroup 122A and those in the second subgroup 122B not exceed example value of 28. Therefore, FIG. 1D illustrates one example in which selected subgroups of a bid group 102I can have their own budget constraint, and that there may be an overall budget is constraint that applies to all the bids in the bid group 102I.

Those skilled in the art will recognize that while only two subgroups are shown in the bid group 102I, the bid group could have any number of subgroups 122. Further, those skilled in the art will recognize that any number of levels of nesting of budget constraints may be applied to a particular bid group even though only two levels are shown here for bid group 102I. Furthermore, those skilled in the art will recognize that not all subgroups 122A, 122B are required to have a budget constraint 116, and that one subgroup may have a budget constraint, while other subgroups do not have budget constraints. Still further, though skilled at will recognize that other constraints in addition to budget constraints may be applied to groups, subgroups.

The data structures described above with reference to FIGS. 1A-1B represent assignment messages as defined in the appendix of U.S. patent application Ser. No. 12/340,999 entitled "Assignment Exchange and Auction," filed on Dec. 22, 2008, which is incorporated herein by reference in its entirety. An assignment message consists of a collection of bids $(k_j, v_j, \rho_j, l_j, u_j)$ and a bound forest $\{T_0, \ldots, T_K, \{(l_{kS}, u_{kS})|S \in T_k, k=0, \ldots, K\}\}$, as described therein. A basic assignment message is an assignment message with each $\rho_j=1$ and with all bounds $l_{kS}$ and $u_{kS}$ integers. A budget message is an augmented assignment message, wherein, for each collection of bids S in the bound forest, in addition to the optional quantity constraints on the bids in S of an assignment message, the budget message may also or alternatively include a budget constraint, which specifies a maximum amount that the bidder is willing to spend on the collection of bids S. Thus, the budget constraint of a budget message may be applied to all the bids by a bidder or to a subset of bids, regardless of whether any other constraints have been applied. Furthermore, a budget message may have a plurality of budget constraints applied to different groups or sets of bids in the collection of bids.

FIG. 2 shows one embodiment of the budget-augmented assignment exchange and auction system 100 according to the present invention. The budget-augmented assignment exchange and auction system 100 comprises a server 202, a network 204, a plurality of trader systems 206A-206N and the data store unit 208. The trader systems 206A-206N are coupled by the network 204 to the server 202.

The server 202 is a conventional computer including a processor, memory, non-volatile storage and a network connection. The server 202 may optionally include one or more input devices and one or more output devices. The server 202 is an apparatus for performing the auction or exchange, for receiving assignment messages, creating and sending reporting messages, for retrieving and storing data sets to and from the data storage unit 208. The server 202 is coupled for communication and interaction with the plurality of trader systems 206A-206N via the network 204. The server 202 is also coupled for communication and interaction with the data storage unit 208. The server 202 is hardware capable of executing and performing routines to achieve the functionality described below with reference to FIGS. 3, 5 and 6. While the present invention will now be described with reference to an embodiment in which the server 202 is both an auction and an exchange, those skilled in the art will recognize that alternate embodiments of the present invention include embodiments of the server 202 having fewer than the components described below, but enough of the components to operate only as an auction system or only as an exchange system. The server 202 comprises an interface module 232, an auction module 234, an exchange module 236 and an allocation system 238. In one embodiment, the server is a Microsoft .NET 3.5 server application that is tightly integrated with a MS SQL Server 2007 database and running on a standard Windows Server computer and is accessed by standard browsers over the Internet.

The interface module 232 is software and routines executable on the server 202 to create the user interfaces depicted below in FIGS. 4A-4C. The interface module 232 also controls and handles the communication between the server 202 and the plurality of trader systems 206A-206N. The interface module 232 also controls the exchange of data between the data storage unit 208, the auction module 234, the exchange module 236 and the allocation system 238. In one embodiment, the interface module 234 is responsible for receiving assignment messages and translating them into a data format usable by the other components of the server 202. The interface module 234 is also responsible for creating and sending reporting messages to the plurality of trader systems 206A-206N. In one embodiment, the interface module 232 is also capable of reporting results to bidders and administrators.

The auction module 234 is software and routines executable on the server 202 to operate and run an auction. In one embodiment, the auction module 234 is adapted for interaction and communication with the interface module 232 and the allocation system 238 during the operation of the auction. The auction module 234 controls the receipt of bid groups and cooperates with the allocation system 238 to determine a winning bid group and send out notification messages. The auction module 234 also cooperates with the interface module 232 to receive and store data sets relating to the auction to and from the data storage unit 208. The exchange module 236 is software and routines executable on the server 202 to operate and run an exchange. In one embodiment, the exchange module 236 is adapted for communication and interaction with the interface module 232 and the allocation system 238 for operation of the exchange. The exchange module 236 controls the receipt of bid groups and cooperates with the allocation system 238 to determine a list of winning bid groups and send notification messages to the trader systems 26A-206N. The exchange module 236 also cooperates with the interface module 232 to receive and store data sets relating to the exchange to and from the data storage unit 208.

The allocation system 238 is software and routines executable on the server 202 to determine an allocation of lots that maximizes a total money value for a plurality of bid groups subject to one or more constraints. As noted above, the allocation system 238 cooperates with the auction module 234 and/or the exchange model to create an auction or exchange, respectively. The operation and components of the allocation system 238 are described below in more detail with reference to FIGS. 3A-3B. The allocation system 238 interacts with the data storage unit 208 via the interface module 232. In one embodiment, the allocation system 238 implements the method described below with reference to FIG. 6.

The network 204 is of a conventional type such as the internet for interconnecting computing devices. The network 204 can be any one of a conventional type such as a local area network (LAN), a wide area network (WAN) or any other interconnected data path across which multiple computing devices may communicate.

Each of the trader systems 206A-206 is a computing system such as a personal computer and includes a graphical user interface module 222, a bid group collection module 224 and a bid group transmission module 224. In one embodiment, the graphical user interface module 222, the bid group collection module 224 and the bid group transmission module 224 are software operable on a general purpose computer. In another embodiment, the graphical user interface module 222, the bid group collection module 224 and the bid group transmission module 224 are specialized hardware for providing functionality described below and with reference to the user interface of FIGS. 4A-4C.

Figure 4A:
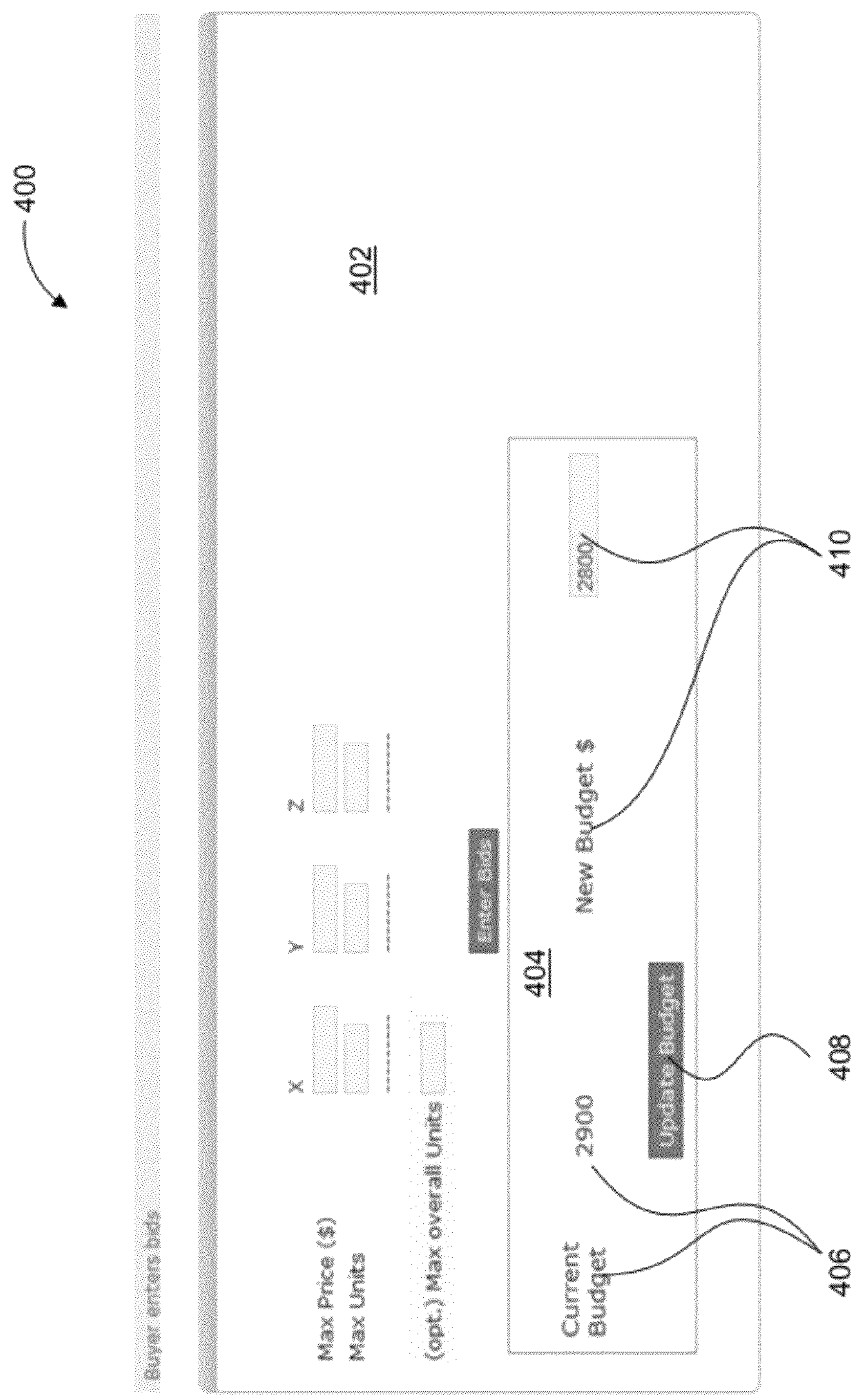
FIGS. 4A-4C are graphic representations of embodiments of example user interfaces generated by multi-item auction system that incorporates bidder budgets in accordance with the present invention.
Figure 4B:
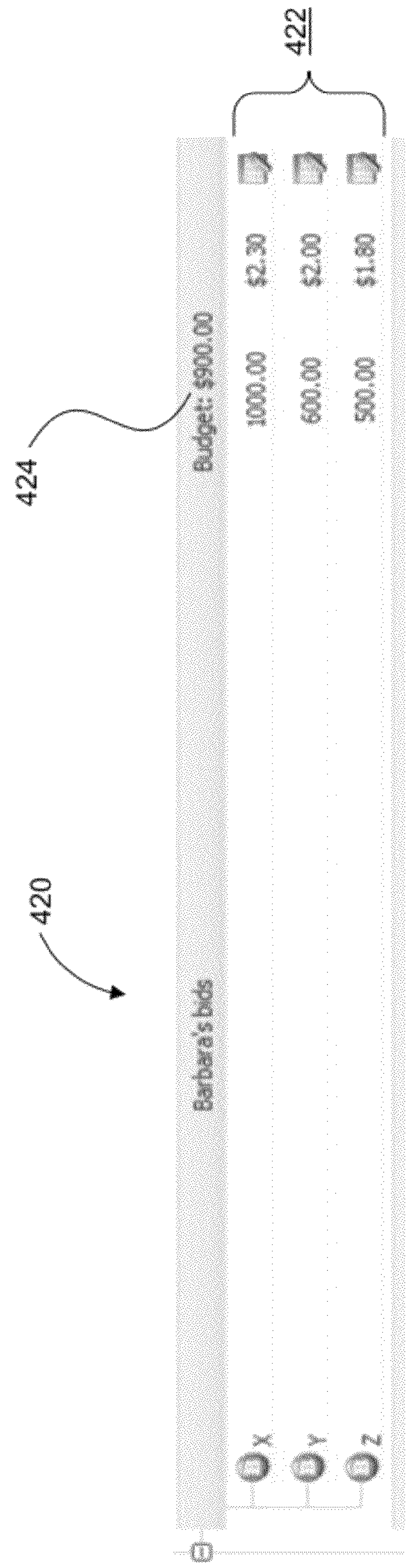
Figure 4C:
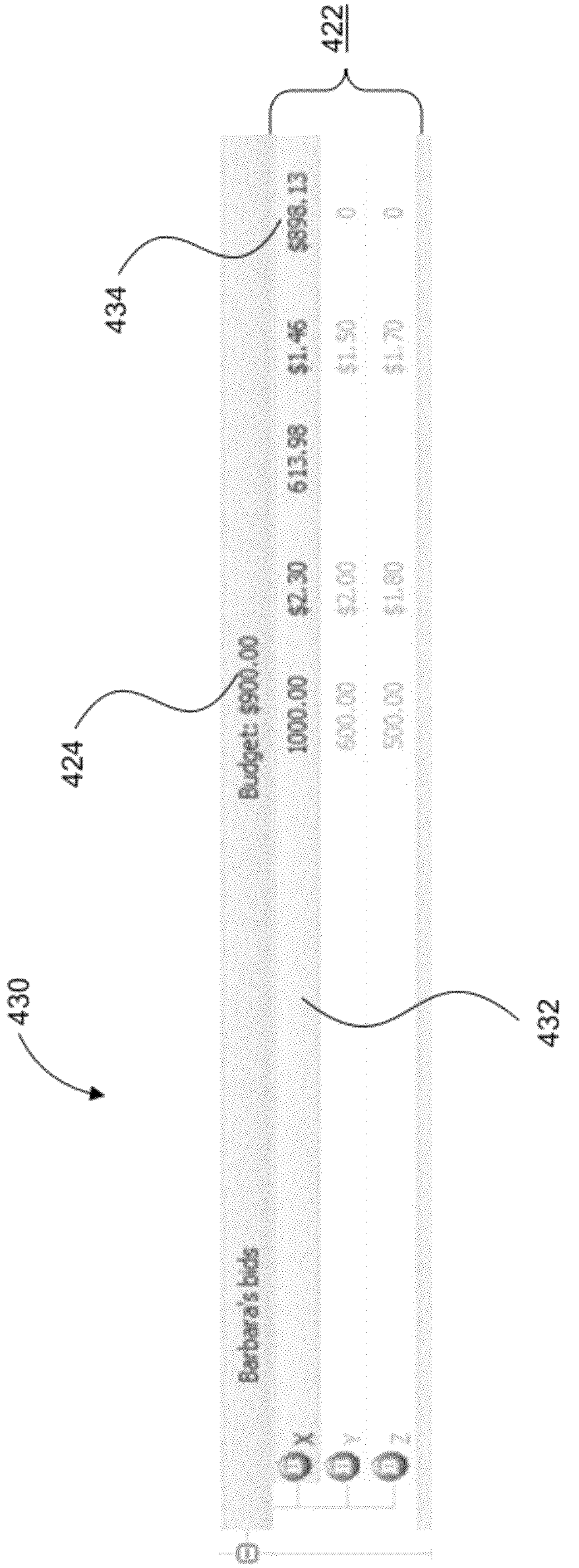

In one embodiment, the graphical user interface module 222 is software and routines executable by the trader system 206A to provide the graphical user interface shown in FIGS. 4A-4C. For example, the graphical user interface module 222 includes a conventional type browser such as Internet Explorer from Microsoft Corporation or Firefox form the Mozilla Foundation. The graphical user-interface module 222 also presents the user interfaces as described below. The graphic user interface module 222 interacts, cooperates and communicates with the bid collection module 224 and the bid group transmission module 226.

The bid group collection module 224 is software and routines executable by the trader system 206A to collect information related to bid groups. The information collected by the bid group collection module 224 include the actual information used to formulate bids and bid groups, control and administrative information for the presentation of data, user accounts, auctions, exchanges, etc. The bid group collection module 224 is adapted for communication with the graphical user interface module 222 and the bid group transmission module 226.

The bid group transmission module 226 is software and routines executable by the trader system 206A to send bids and bid group information to the server 202. In one embodiment, the bids and bid group information are sent to the server 202 as assignment messages. The bid group transmission module 226 take the information generated by the bid group collection module 224 and transmits it to the server 202. In one embodiment, the bid group transmission module 226 is responsible for establishing a secure communication link with the server 202. The bid group transmission module 226 also receives report messages from the server 202. The report messages include data that is presented to the user in some of the interfaces such as those shown in FIGS. 12 and 13. The bid group transmission module 226 provides the information to the graphical user interface module 222 which is presents the information to the user. The bid group transmission module 226 is adapted for communication with the bid group collection module 224 and the server 202.

In an alternative embodiment, the trader system 206A may be replaced by a message import module 240. The message import module 240 communicates over the network 204, or it may read its information directly from a type of computer storage or other computer memory device. The message may be encoded in the Extensible Markup Language (XML) format or another suitable format. The message import module 240 reads bidder messages, including budget and other constraints, and causes them to be stored in the data storage unit 208, from which they are operated on in a similar way to messages that are received from the trader system 206.

The data storage unit 208 is a device such as a hard disk drive or other storage media. The data storage unit 208 is shown as being coupled to the server 202. The data storage unit 208 is used to store data sets including bid groups, bids, constraints and other information necessary for the execution of an auction or an exchange.

Allocation System

Figure 3A:
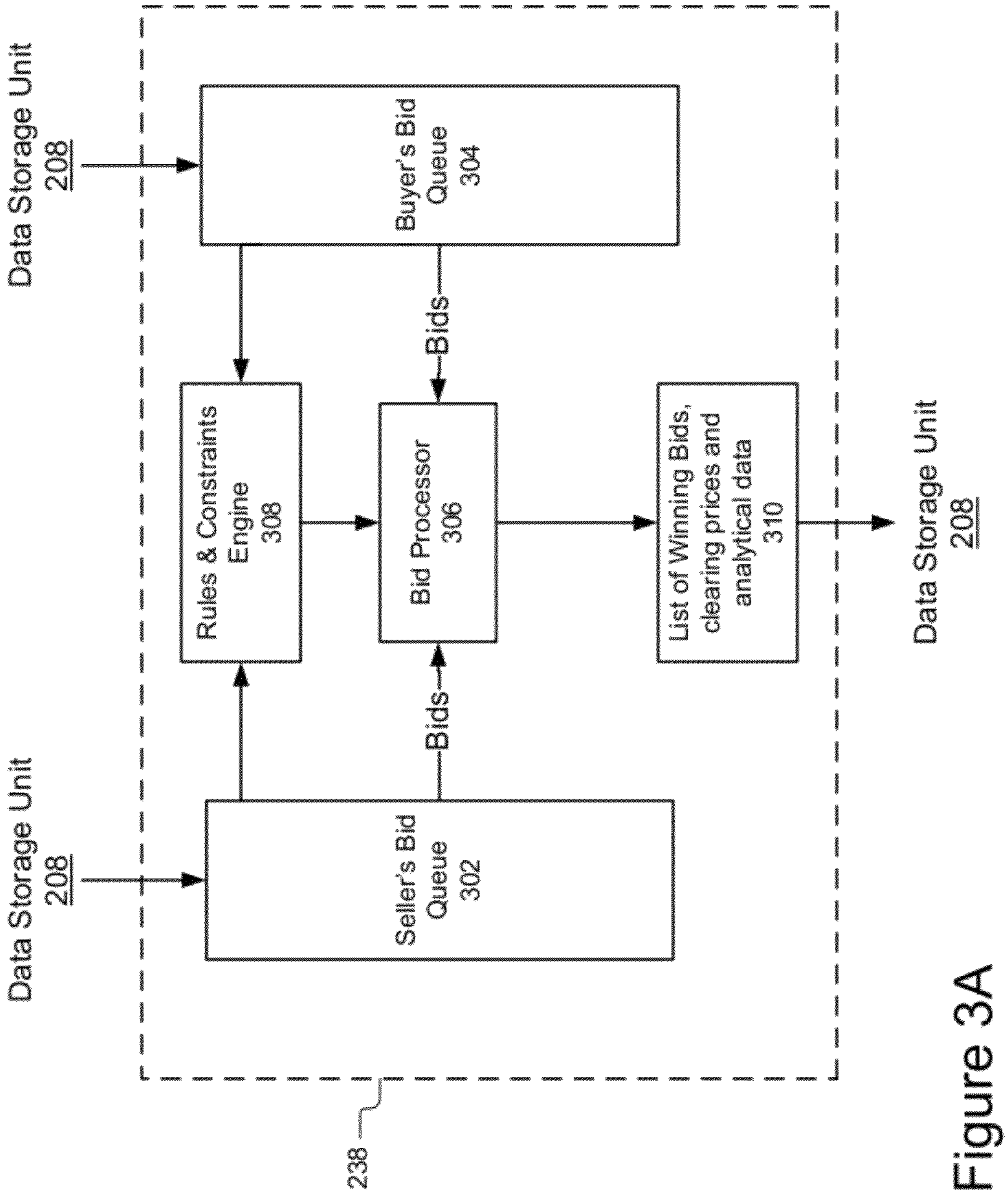
FIG. 3A is a block diagram of a first embodiment of an allocation system in accordance with the present invention.

FIG. 3A shows a first embodiment of the allocation system 238. The allocation system 238 comprises a seller's bid queue 302, a buyer's bid queue 304, a bid processor 306, a rules and constraints engine 308, and storage 310 for a list of winning bids and other information. The traders' bid groups, including both bids to buy and offers to sell, are collected as data sets and stored in the data storage unit 208, along with other possible restrictions such as minimal lot sizes, limits on the quantity assigned to groups of bids, maximum allocation per buyer, etc. The allocation system 238 accesses the data storage unit 208 and retrieves the bid groups that have been received from the plurality of trader systems 206A-206N. The retrieved bids to sell are stored in the seller's bid queue 302 and any rules or constrained information related to bids to sell are output by the seller's bid queue 302 to the rules and constraints engine 308. The bids to sell stored in the seller's bid queue 302 are also accessible by the bid processor 306. Similarly, the allocation system 238 stores retrieved bids to buy in the buyer's bid queue 304, provides any rules or constrained information related to the bids to buy from the buyer's bid queue 304 to the rules and constraints engine 308 and makes the bids to buy accessible by the bid processor 306.

The allocation system 238 then uses rules and constraints engine 308 to process the bids from the sellers bid queue 302 and buyers bid queue 304 to determine rules and constraints to determine the allocation of lots and the market-clearing prices in an auction or exchange. These rules and constraints are output from the rules and constraints engine 308 to the bid processor 306. The bid processor 306 then processes the rules and constraints, the bids in the sellers bid queue 302 and the buyers bid queue 302 to generate a list of winning bids, if any, clearing prices and analytical data. The bid processor 306 stores those bids, the clearing prices and other analytical data in storage 310. Part of the resolution is substitution of similar commodities (C1, C2 and C3 in this example) matching the bid vectors and, if any, external rules and constraints (for example, limits on the quantities assigned to groups of bids). That allows for allocation of resources at a market-clearing price, hence an efficient allocation of resources. In one embodiment, the bid processor 306 determines the goods allocation by maximizing the net bids associated with the outcome subject to constraints on combinations of acceptable bids and subject to the additional constraint that no bidder's payment exceeds any of its budget constraints.

Figure 3B:
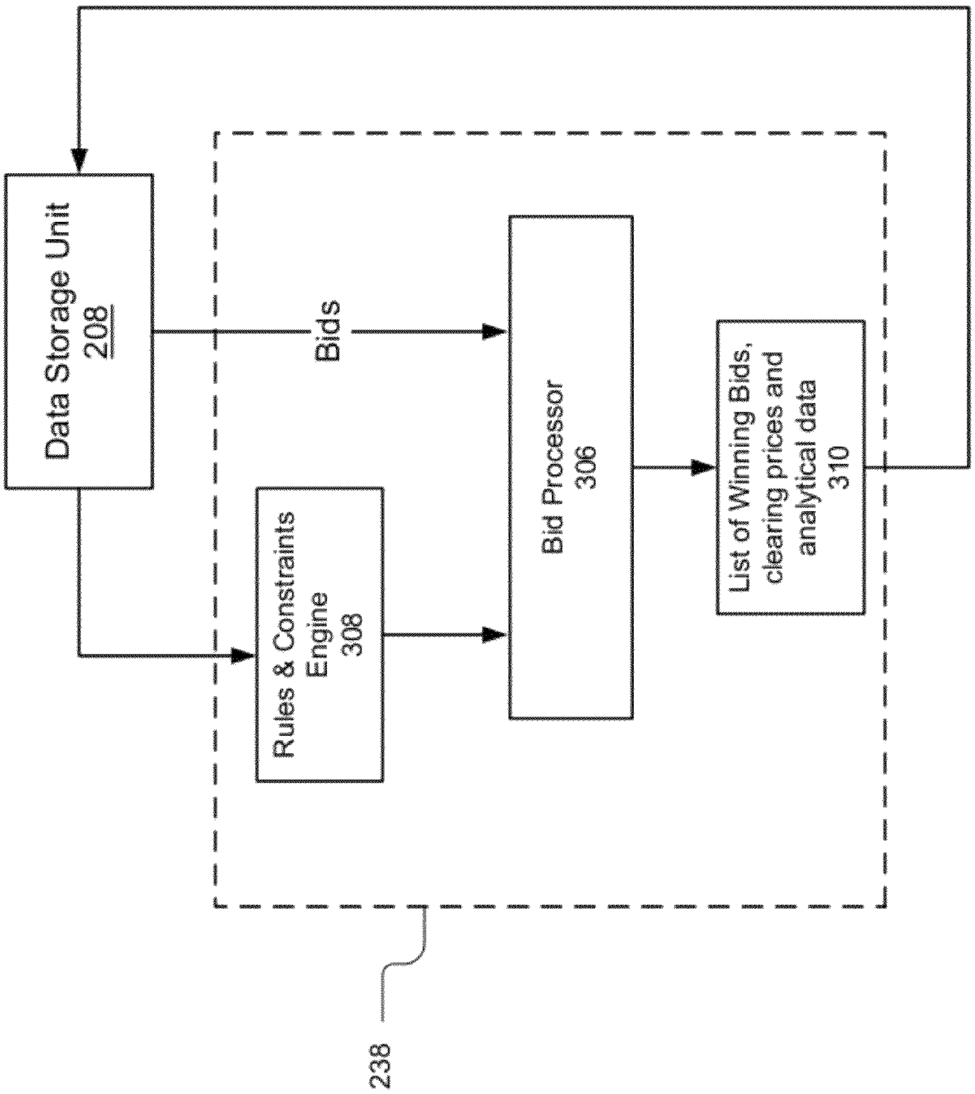
FIG. 3B is a block diagram of a second embodiment of the allocation system in accordance with the present invention.

FIG. 3B shows a second embodiment of the allocation system 238. This second embodiment of the allocation system 238 comprises the bid processor 306, the rules and constraints engine 308 and storage 310. The traders' bid groups, including both bids to buy and offers to sell, are collected as data sets and stored in the data storage unit 208, along with other possible restrictions such as minimal lot sizes, limits on the quantity assigned to groups of bids, maximum allocation per buyer, etc. The allocation system 238 accesses the data storage unit 208 and retrieves the bid groups that have been received from the plurality of trader systems 206A-206N. The traders' bid groups are retrieved from the data storage unit 208 by the rules and constraints engine 308 and the bid processor 306.

The rules and constraints engine 308 processes the bids from the data storage unit 208 to determine rules and constraints. These rules and constraints are output from the rules and constraints engine 308 to the bid processor 306. The bid processor 306 processes the rules and constraints, and the bids from the data storage unit 208 to determine the allocation of lots and the market-clearing prices in an auction or exchange. The bid processor 306 then generates a list of winning bids, if any, clearing prices and analytical data. The bid processor 306 stores those bids, the clearing prices and the analytical data in storage 310. This information can also be stored in the data storage unit 208 for use by the auction module 234, the exchange module 236 or the interface module 232. While the above description presents the allocation process as sequential, those skilled in the art with recognize that in other embodiments, the allocation can be determined all at once where the bids are transmitted to the allocation system 238 which then runs a solver on the bid processor 306 that computes the allocation and prices. In one embodiment, the bid processor 306 processes the overall budget constraint in accordance with FIG. 6.

Prior to an auction, in some cases, the auctioneer may publish guidelines, results of prior auction or exchange events, and some bids for informational purposes. Depending on the published information, traders may have multiple bids. For example, a buyer may have multiple bids with each representing the needs of a particular factory. The exchange module 236 awards quantities as the solution of a particular linear program, which maximizes the difference between the total money values of the awarded bids to buy minus the total money value of the awarded offers to sell. If there are multiple allocations that achieve the maximum in the linear program, the exchange module 236 resolves among those using a quantity-tie-breaking rule. The exchange module 236 also determines prices for each product by solving the dual linear program. The resulting prices are market-clearing prices. If there are multiple solutions to the dual linear program, then the exchange resolves among those using a price-tie-breaking-rule. For example, if the exchange operates as an auction with a single seller and multiple buyers, the lowest market-clearing price for each commodity or right may be determined. The various items sold may have different prices to reflect various differences. For example the difference may be the product grade, such as coffee beans that differ in origin, size and color, or it may be the location of delivery, which affects the costs of transporting the product to its place of use, or it may reflect the time of availability or contract terms or degree of processing, etc.

It is clear that many modifications and variations of this embodiment may be made by one skilled in the art without departing from the spirit of the novel art of this disclosure. For example, depending on the auction, who holds the auction, and who takes the bids to buy and sell, different rules may be published and hence used in a rules-and-constraints engine to resolve those bids. These modifications and variations do not depart from the broader spirit and scope of the invention, and the examples cited here are to be regarded in an illustrative rather than a restrictive sense. The approach described here can be used both online and, in simple cases, offline. Also, sellers might be limited to a single offer, or, in more commoditized situations, many bids, sometimes in regular time intervals, sometimes as a one time or occasional auction.

The advantages of the current invention are that maximum value relative to the bids is always achieved, market-clearing item prices are determined, prices properly reflect relevant differences in cost and value to the traders (including buyers, sellers, and swappers), integer solutions supported by market-clearing prices can be guaranteed, and bidding is quick and easy.

User Interfaces

In the budget-augmented assignment exchange and auction system 100 as described earlier in FIGS. 2 and 3, one of the important aspects is assignment messaging and how to enter necessary auction restrictions or combinations, typically in the form of rules. FIG. 4A shows a graphic representation of a first embodiment of a user interface 400 generated by the budget-augmented assignment exchange and auction system 100. The user interface 400 (depicted as a screen shot of a simulation) is a window that allows a user to enter auction rules and thereby form restrictions on his bids or offers. The user interface 400 is particularly advantageous because it provides an easy and simple way for the user to input an overall budget for all the bids included within this bid group. A transaction window 402 provides an area for inputting information about bids such as pricing and units. In this example, the transaction window 402 provides a message space for substitution qualities and budgets on lots X, Y and Z. The transaction window 402 presents a plurality of text boxes or fields for the user to input the types of lots that are the subject of this example bid. The user interface 400 includes another area 404 in which budget constraints can be input for the bids shown in the transaction window 402. In one embodiment, this other area includes a label and data 406 indicating the current budget, a selectable button 408 for updating the budget using the data input in this area 404 and a label and a box 410 for inputting new values that the user would like to set as an overall budget for the bids.

Although not shown, the user interface could include other sections with elements that form a dashboard-type window where the user can view important data such as, for example, parameters, listings, and participants. The user interface could include other areas for the user to select the type of transaction or bid for entry into the system as well. Depending on the participant's role or roles (administrator, buyer, seller, etc.), some of these elements shown are excluded from the user interface 400.

FIG. 4B shows an embodiment of an interface 420 for presenting a budget constraint, as well as a plurality of bids for review by a bidder. For example, FIG. 4B shows a bid group 422 for a hypothetical user bidding on three lots, named X, Y and Z. Each of the bids in the bid group 422 is shown as a row of the user interface 420. The row indicates an identifier for the lot, and overall bid amount and a unit price. The interface 420 also provides a button for each row that when selected by the user transitions to the user interface of FIG. 4A and allows the user to edit that particular bid. Furthermore, the user interface 420 is particularly advantageous, because it presents the overall budget 424 for the bid group on the same row as the bid group identifier. This provides the user with a clear indication of what the overall budget constraint is for all the bids in the bid group. Those skilled in the art will recognize that it is advantageous to present the budget constraint above the individual bids for quick and easy comparison.

Referring now to FIG. 4C, an embodiment for a reporting interface 430 is shown. To reporting interface 430 is similar to the bid review interface 420. The reporting interface 430 shows each of the bids in the bid group 422 as a series of rows. The reporting interface 430 also provides a text label to identify the bid group, as well as showing the budget constraint 424 for the bid group 422. This interface also shows, which of the bids has been successful, in other words, which bids have been assigned goods at the specified prices. In this example, the bid X was successful, while bids Y and Z were not. Additionally, the reporting interface 403 shows the price of the assigned goods. As can be seen from the example shown in FIG. 4C, the assigned price 434 of $898.13 is below the budget of $900. The reporting interface 403 also shows the bids that have been assigned goods specified prices in a visually distinct manner such as with green highlighting for the example of FIG. 4C. Those skilled in the art will recognize that other types of highlighting or visual feedback to call out the successful bids could be applied without departing from the spirit and scope of the present invention.

Those skilled in the art will recognize that the budget information, bids and bid groups can be presented to the user and variety of different ways and the above examples of FIGS. 4A, 4B and 4C are merely by way of example.

Methods

Figure 5:
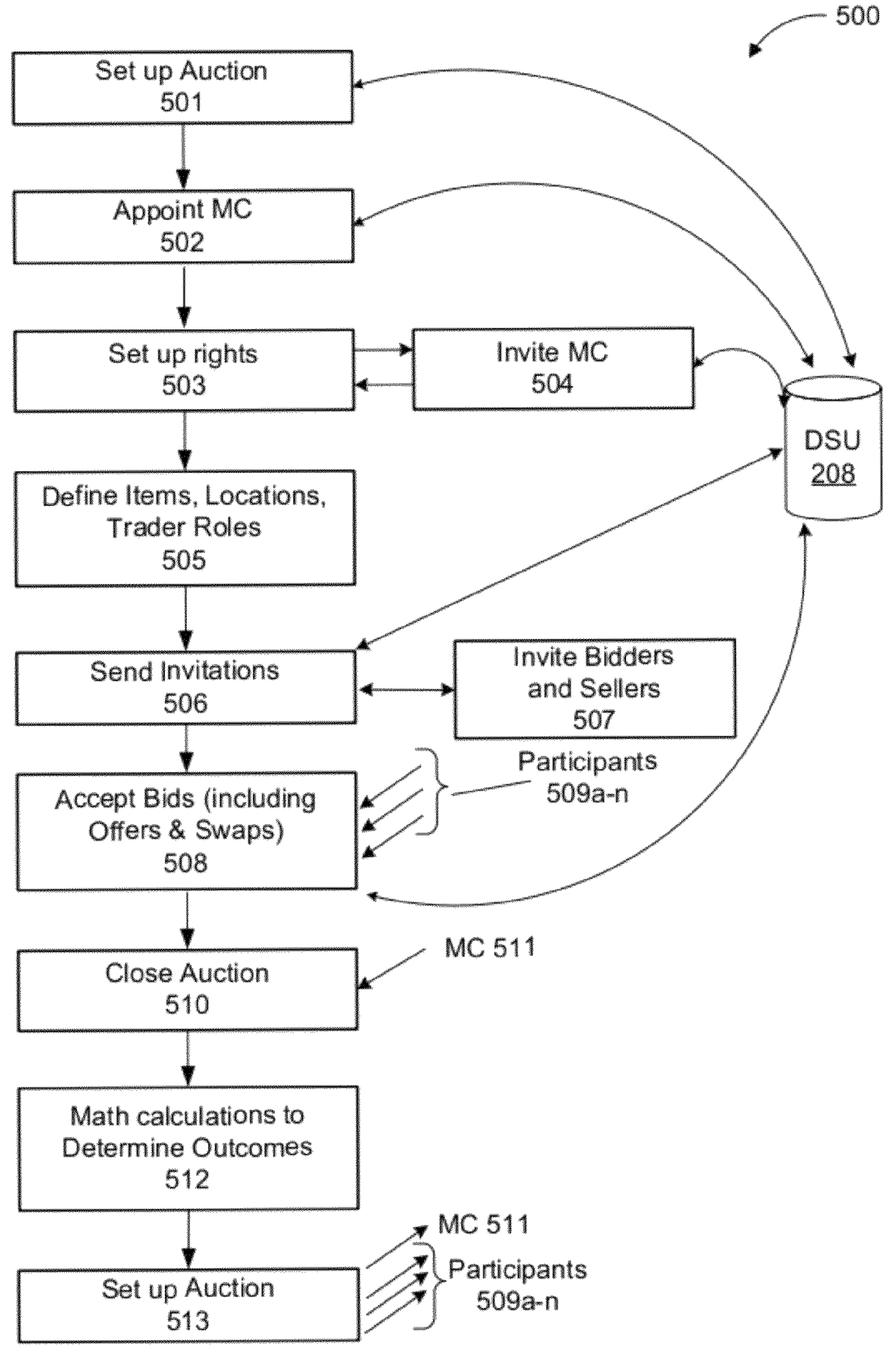
FIG. 5 is a flow diagram of a method for processing bid groups in accordance with an embodiment of the present invention.

FIG. 5 shows a process 500 for performing an auction or exchange according to one embodiment of the present invention. In step 501, a system administrator or some other person working with the system 100 sets up an auction. For example, the system administrator inputs commands to the server 202 to set up a new instance of an auction module 234. Typically, a master of ceremonies or an auctioneer is appointed, as indicated in step 502. The master of ceremonies (MC) or auctioneer is a user such as an administrator that is given limited privileges, which privileges include the ability to set up auctions for a specific account, but not to appoint MCs for other accounts, for example. Other limitations may also exist in terms of financial control, etc. In one embodiment, this includes creating a profile, password, user ID and other information in the system 100 for a particular user to act as the MC. In step 503, the rights that are granted to the MC are selected, and then in step 504, an invitation message is sent in the system 100 to the MC. Typically, the MC is an accredited participant or auctioneer in such the system 100. In some cases, the auction house is itself the seller and/or buyer and assigns certain employees to run the auction. In other cases, the auction is provided as Software-as-a-Service (SaaS), which is run by some other company, and the auction house is a high-level MC in this case, which in turn, appoints employees to conduct specific auctions. Thus the administrative functionality may be multi-tiered. In step 505, the MC defines the details of the auction, including items for sale or swap, delivery location, and trader roles, including which participants are permitted to buy or sell each type of item and in what quantities, credit limits (if any) which may restrict the highest total bid, etc. All this information is received by the server 202 and stored in the data storage unit 208. In step 506 the system 100 on behalf of the MC creates and sends a list of participants (users of the system 100 that access is via a trader system 206A) to be invited, who are, for example, companies desiring to buy, sell, or swap a commodity, customers of a manufacturer, the participants in an electricity network, etc. In step 507, the invitations are sent to the participants to act as bidders and/or sellers. In some cases, when participants want to swap items, there is no clear distinction between bidders and sellers. Examples include oil producers that are also refiners and may either buy or sell petroleum supplies at different locations, or electricity distributors who own supply contracts that they might sometimes prefer to sell or swap for more highly valued contracts. In other cases, however, there may be a clear distinction between the suppliers (sellers) and users (buyers) of the lots. In step 508, the participants 509 use trader systems 206A-206N to enter bids to buy, sell, and/or swap for a given period, and then at a set time, in step 510 the MC 511 closes the auction. In one embodiment, the messages have a format for a sealed bid auction with the messages in groups of bids that have an overall budget constraint similar to the examples described above with reference to FIG. 1C. Then in step 512 the allocation module 238 performs mathematical programming calculations, for example the linear programming calculations described in Appendix A, are used to determine the item prices and possibly the tentative goods assignments or, in some cases, vice versa. In one embodiment, this includes applying the overall budget constraints such as for example detailed in FIGS. 6A-6B below. In step 513, the results are provided via trader systems 206A-206N to notify all the participants 509. In one embodiment, this is performed the system 100 such as by sending e-mail messages, Simon messages or text messages.

In some cases, the auction may be operated in two stages, with bidders 509 permitted to change their bids and groups based on information reported after the first stage. In these cases, the rules and constraints engine 308 determines which bids can be changed and what new bids are allowed.

Sealed Bid Auction with Expanded Message Space to Allow for Budget Constrained Bids The present invention is particularly advantageous because it expands the expressivity of bidding (See FIGS. 1C and 1D described above) and extends the auction algorithms (see FIGS. 6A-6B below) in an important class of commercial, multi-item auctions. The expanded expressivity allows bidders to express and have the allocation system 238 respect, an overall budget limit where multiple related goods are on offer in a sealed-bid auction. The importance of this is that bidders can bid freely on several goods, expanding the overall market and increasing competition. For sellers that are trying to raise revenue or governments that are also trying to allocate scarce resources to the most valuable uses, this means a more efficient marketplace with better outcomes.

The present invention overcomes several technical and theoretical challenges of the prior art; and therefore, is particularly advantageous in a number of respects. First, the present invention provides auction rules that are extensions of existing mechanisms, so that the use of budgets is optional for bidders and imposes no burden on them. Without this, there would be resistance to the present invention and slow the spread of the new auction design. Second, the present invention ensures that the new auction is computationally efficient so that it can be used with confidence at scale. Third, the present invention avoids introducing loopholes that can be exploited by those seeking to collude or otherwise manipulate prices. Finally, and in the same vein, the present invention ensures that the new auction is strategically simple, reducing the guesswork required of a bidder who faces a real budget constraints but does not know which lots to bid.

This embodiment of the present invention will be described in the context of sales of mineral rights such as oil and gas. In this area, historically poor designs have radically reduced the revenues to governments, and in some cases misallocated the rights so that they are poorly exploited. This is particularly important in an environment where governments are seeking revenues from non-tax sources, and natural resources themselves are increasingly scarce. There is also potential for substitutes and budget constraints to radically increase competitive bidding and improve both revenues and utilization. However, those skilled in the art will recognize that the principles of this embodiment of the present invention are applicable to any sealed bid auctions where budget constraints are desirable. For example, this embodiment of the present invention can be used in energy industries such as electricity power sourcing, pipeline and transmission capacity, financial instruments, and others. Additional information about the present invention and its underlying theories is provided in Appendix A below as background.

In one embodiment, the system 100 is a sealed-bid auction format that participants use over the Internet in a Software as a Service (SaaS) model. The system 100 is a SaaS software platform that bidders use to enter their bids and other constraints, and that calculates the assignment of goods to bidders and prices, and provides reports on the character of the bids that serves as crucial business intelligence. The customers are typically businesses selling goods or entities selling rights to use public assets, and are normally responsible for defining the goods for sale, attracting and training bidders and clearing the transactions after the auction is completed. The auctioneer opens the system for bids and bidders log in and place their bids. The auctioneer closes the auction at an announced time, and the allocation system 238 computes the assignment of goods to bidders and prices according to the rules that had been established by the customer.

Many embodiments of 238 find, explicitly or implicitly, a vector of prices p and a vector allocation of lots to bids x, with the property that x approximately maximizes the net value of the allocation, denoted for short by V(x), subject to $x \in G \cap M \cap B(p)$. The bids x include the seller's supply bids, which describe the quantities that it supplies and any applicable reserve prices. The net value V(x) is linear function of x: it is the value of the buyers' bids minus the seller's bids, in case any of the reserve prices are positive. The constraint set G is formed from a set of linear inequalities reported as bid-group quantity constraints by the bidders: G is mnemonic for "group." The constraints M are the market-clearing constraints that the total quantities of each type of lot assigned to bidders under x are equal to the quantities supplied by the seller according to x: M is mnemonic for "market-clearing." The budget constraint set B(p) is also formed from a set of linear inequalities, which require that, if the prices were p, then the cost of the lots x assigned to each bid would not exceed any budget limits reported in the bidders' messages.

Figure 6A:
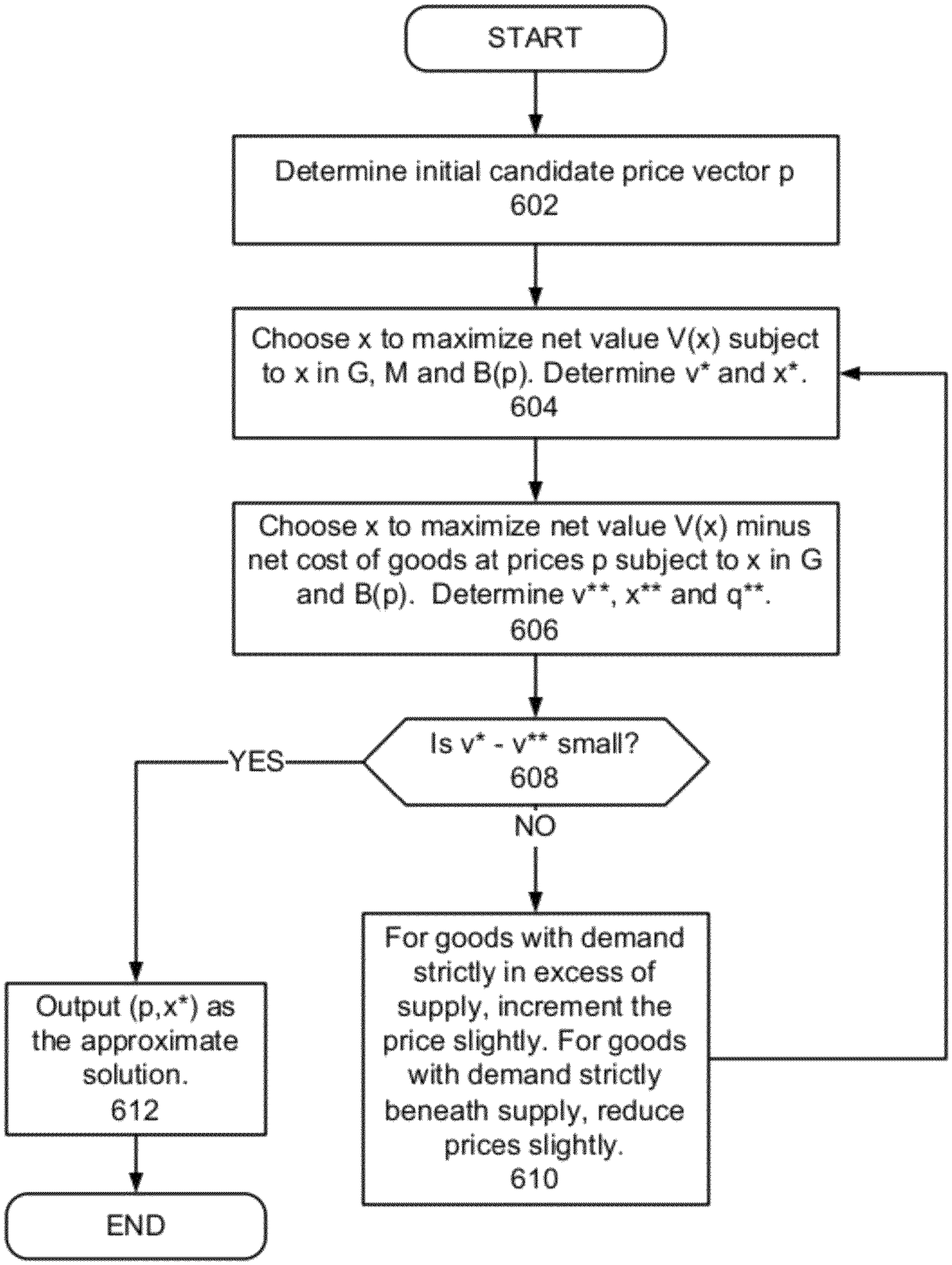
FIG. 6A is a flow diagram of a method for determining an allocation of items to bids that incorporates bidder budgets in accordance with an embodiment of the present invention.

Referring now to FIG. 6A, one embodiment for a method of operating the allocation system 238 that respects bidding budgets in a uniform-price, sealed-bid auction will be described. The first step 602 of the method is to specify an initial candidate price vector p. Among the many ways to select an initial candidate for p, one is to maximize the linear objective V(x) subject to the set linear constraints $x \in G \cap M$ and take the initial p to be the prices associated with the market clearing constraints. The next step 604 maximizes V(x) subject to $x \in G \cap M \cap B(p)$ to determine both the maximum value v* and a maximizer x*. Step 606 computes the maximum of V(x) minus the net cost of the goods at prices p subject to $x \in G \cap B(p)$. (This net cost of lot at prices p is zero if $x \in M$, because market clearing implies that buyer payments according to x are equal to seller receipts.) This optimization determines a maximum value v, a maximizer x, a vector of prices p, and a net excess demand q, in which for each lot type n, $q^{}_n$ is the excess of demand over supply for that lot type according to x. The price for any lot type is the price associated with the market-clearing constraint for that lot type. Both of the optimizations 604 and 606 can be done using any of the many standard linear programming software packages.

As FIG. 6A shows, the next step 608 is to check whether $v^{**}-v^{*}$ is small. If it is small, then the procedure is complete and (p,x*) is output 612 as the approximate market-clearing solution. If an integer solution is desired, x* may then be rounded in any of several ways to obtain one. For example, the quantities assigned to each buyer may simply be rounded down to the nearest integer. If whether $v^{**}-v^{*}$ is not small, then the price p is adjusted at step 610, replaced by $p+\epsilon\delta$ where E is a small positive number and δ is a vector whose $n^{th}$ component is 0, +1, or −1, having the same sign as q. The method returns to step 602 and uses the adjusted prices as the candidate vector price and repeats steps 604, 606 and 608**.

Figure 6B:
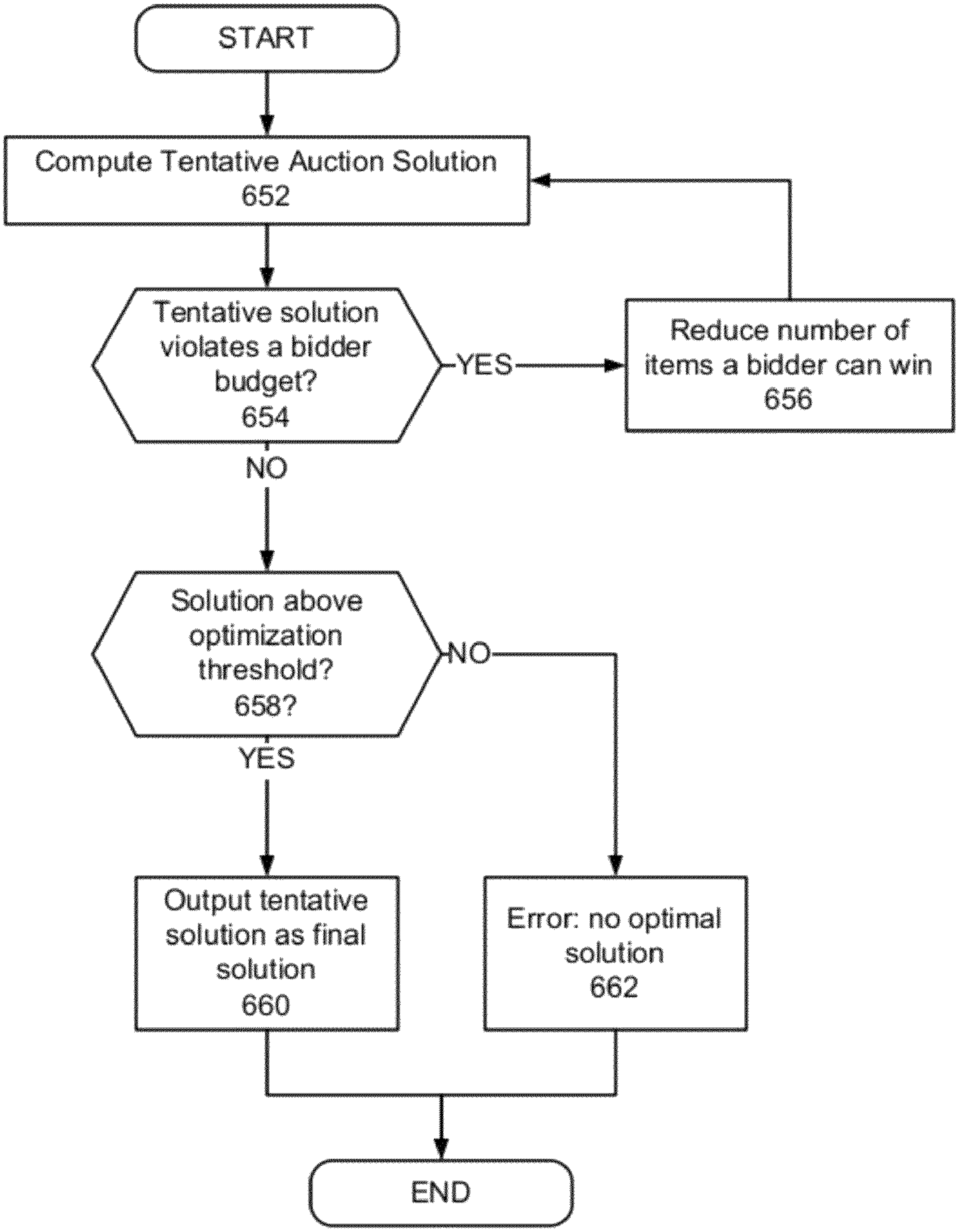
FIG. 6B is a flow diagram of an alternate embodiment of a method for determining an allocation of items to bids that incorporates bidder budgets in accordance with the present invention.

Referring now to FIG. 6B an alternative embodiment for a method of operating the allocation system 238 that respects bidding budgets in a sealed bid auction will be described. The method begins by computing 652 a tentative auction or allocation solution. In other words, a possible allocation of lots to bids at particular prices is computed. Then the method determines 654 whether the tentative auction solution computed in step 652 violates any bidder budgets. Since the allocation system 238 is using extended messages like those described above with reference to FIG. 1C or 1D, the allocation system 238 determines whether any bidder budgets are violated by comparing the overall budget constraint 116 for the bid group 102G with the prices computed for the tentative auction solution. The present invention is particularly advantageous because computations involved in this procedure would be straightforward and the resulting solution explainable to bidders: "number constraints were added to your bid (or 'auction data message') in order to honor your budget request." If the method determined that the tentative auction solution violates a bidder budget, then the method continues by reducing 656 the number of items that a bidder can win. After step 656, the method returns to step 652 to compute another tentative auction solution. However, this time the algorithms used to compute the tentative auction solution limit the number of items a bidder can win to the number set in step 656. The method then continues to step 654 to test whether the second tentative auction solution violates a bidder budget. The processing steps 652,654 and 656 are performed iteratively and until the tentative solution does not violate any bidder budget.

If the tentative auction solution is determined in step 654 not to violate any bidder budgets, the method continues to step 658 in which the method determines whether the data solution is above a predefined optimization threshold. In certain circumstances, the iterative mechanism described above may yield poor results because of the inherent compromise in reducing the number of items in a bidder can win. In order to ensure that these poor results are not output as a final solution, the method tests 658 whether the solution is above the authorization threshold set. If the tentative auction solution is determined to be above the optimization threshold, the method continues to step 660 and the tentative solution is output as the final auction result. On the other hand, if the tentative auction solution is determined not to be above the optimization threshold, an error is reported 662 and no optimal solution is provided. In an alternate embodiment, step 658 and 662 can be eliminated from the method which would proceed directly from step 654 to 660.

Those skilled in the art will recognize that an alternate embodiments, there a variety criteria that can be used to generate theoretically optimal outcomes instead of the iterative solution described above. Moreover, while the invention has been described above primarily as applying to buyers, the present invention also applies to sellers who may wish to sell (a group of assets) at prices just sufficient to meet a revenue-objective.

EXAMPLES

Quantities: The most common next step in auction complexity is extension to multiples of the item. In that case, the message space must be at least expanded to allow for a statement of price and quantity. But what if a bidder has interest in varying quantities at different prices? Perhaps he is a buyer of used cars at wholesale. A seller has 100 2006 Toyota Camry's of a certain quality grade for sale. This buyer needs to fill his retail lot with 3 cars, but if the price is favorable enough, he has room in storage for 7 more cars. He thinks a fair price is $10,000 so he will bid that for 3 Camry's, but at $9000, he would buy 7 more for storage.

If the message space provided by the auction design only allowed for one price/quantity bid, this buyer would be unable to express his preference. He would probably put in a bid for 3 Camry's at $10,000. But if there were an oversupply in the auction and the price was actually $8500, he would have been disappointed to not buy the other 7 cars. (He could have alternately placed a bid for 10 at $9000, but then we would be less likely to get the 3 he really needed).

A better message space would provide for multiple bids. He could have placed a bid for the 3 at $10,000 and another for 7 at $9000. Another sophisticated buyer might have even more price points at which he was interested in different quantities. Still another improvement in the usability of an auction system is to allow input of bids in the form of a demand curve which is a more convenient way to specify this kind of multiple quantity bids.

Substitutes: Another common situation in commercial auctions is where multiple types of goods are for sale that vary in some way, but are equivalent in their ultimate use. Suppose that the wholesaler above had Camrys, Accords, and Tauruses for sale, all 2006 in the same condition grade, the 'mid size upgraded' category. A buyer wants just one car, but any one from this category would fit this buyer's need. Nevertheless, the value to him of the 3 models does vary. He doesn't know in advance which would be the best deal in the auction. If he guesses say, and bids for an Accord, he may buy it even though there was an even better deal for him on the Taurus in this auction. These cars are substitutes, and the buyer is advantaged if he can express his bids in a message space that says 'here are my prices for each of these categories, but I want at most one car all together'. Unlike older systems, the present invention looks at all his bids and assigns him the car that beats his expressed price by the maximum amount—giving him the best deal. Crucially, it would simultaneously do the same for all the other bidders and the seller. The result is that the overall value, or gains from trade, in the auction is optimized.

We have an enriched message space in which we can state the quantity and price for each of several goods, along with an overall quantity maximum. If we have still more sophisticated traders, they may need to create a hierarchy of this type of bids, which is supported as well Bidder competition is also increased by the use of substitutes. Example 1: If bidders bid only on loans of specific houses, the loan on Jon's house in Palo Alto (zip 94301) might receive only 2 bids in total and the loan on Betty's house none. If bidders can say: "Give me up to 20 loans, 15 year fixed, on houses in zip code 94301 or up to 15 loans, 15 year fixed, on houses in zip code 94305 but no more than 25 loans, 15 year fixed, in total". Then the loans on Jon's house and Betty's house both receive many bids that will be used for pricing information. Competition on the loan per each single house can be achieved by increasing the number of bidders or by allowing bidders to express substitutes, or both.

Budgets: In commercial auctions, bidders often have monetary limits on what they can spend, regardless of the values in the auction. There may be a bank credit line for example, that cannot be exceeded. When the message space allows for bidding on substitutes with maximum constraints on groups of bids, it can quickly develop that the possible bid fills could exceed the budget. On the other hand, bidders would like to express interest in large quantities so that if prices are sufficiently attractive, they can get more goods. Without a way to express a budget constraint, bidders would have to be overly cautious, and not put out as aggressive a set of bids to be sure they stay within budget. A new element 116 in the message space is the overall budget constraint; the maximum amount that can be spent. The system 100 ensures that the bidder doesn't overspend, and if his successful bids would otherwise exceed the budget, it constrains what he is assigned to give him the best overall value.

Bidder competition is increased by the use of budgets. Example 2: If Investment bank "BuyNow" has a budget of 10 million dollars and it is risk adverse, it will submit total bids for no more than 10 million dollars. However, if "Buy Now" can say "I am willing to bid up to 9 million on the loans of houses of zip code 94301, up to 5 million on the loans on houses of zip code 94306, but I do not want to spend more than 10 million in total", the number of bids received by the loans on houses in zip code 94301 and 94305 have just increased: more competition has been achieved and more information has been collected for pricing.

More bidders will be attracted with the use of complements: Example 3: Some bidders might want to bid only on blocks of loans/houses. For example, some bidders might want to purchase REO in a certain building only if they can purchase the entire REO available on that building. Normally, to attract these bidders, an auction would need to sell the REO's in that building as a single block. This would exclude bidders that are only interested in bidding on single REO's in that building and decrease competition. Auctionomics's complement feature allows attracting both kinds of bidders. The first category of bidders will say "I am willing to pay up to x for REO on the first floor, up to y for ROE on the second floor, but I want them only if I can have them both". The use of complements allows having both big bidders and small bidders in the same auction, and the auction itself will assign the assets to the combination that maximizes the total sell value in equilibrium More bidders and more bidding will be attracted by the joint use of substitutes, complements, minimum and maximum quantities. The joint use of these features allows creating baskets and portfolio diversification, hence attracting the financial players that need to maintain certain risk profiles. Example 4: "I want 30% of my loans in Florida, 40% in Texas and 30% in California because I want geographical risk diversification". Example 5: "I want at least 10 houses in each zip code, because I am going to use a single real estate agent". Example 6: "I want 45% of my portfolio to be in 30 year fixed loans, 25% in 15 year fixed and 30% in 1 year ARM to diversify my temporal risk".

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

APPENDIX A

The present invention solves a problem in market design, which is a newly active branch of applied game theory and economics. The present invention includes an expressive bidding language and related auction mechanisms that are drastically more effective than currently existing auction formats in terms of promoting competitive outcomes. The present invention accommodates bidder budget reports into a practical, multi-item auction.

This background discussion focuses on: (1) the definition of "competitive outcomes," (2) the definition of "related auction mechanisms" and why "tight" mechanisms are best, (3)

evidence that there is a commercial opportunity to create simple mechanisms that promote competitive outcomes much more effectively, and (4) a description of the challenges faced in developing suitable mechanisms.

For this section, we assume readers have a scientific background in economics and game theory. Except as described below, we limit attention to the transferable utility (TU) models of cooperative game theory.

Competitive Outcomes Are Core Allocations. The present invention advantageously creates auctions that bring about "competitive" outcomes in the widest range of situations. For our purposes, a competitive economic outcome is characterized by a particular concept from cooperative game theory: the core.[1]

The use of the core to describe competitive outcomes is justified in greater detail in Milgrom (2007): "Package Auctions and Package Exchanges," *Econometrica,* 75(4): 935-966.

Given a resource allocation problem with transferable utility, a feasible allocation is individually rational if each participant does better to accept that outcome than to refuse it in favor of the no-trade status quo. An imputation is a payoff vector corresponding to a feasible, individually rational allocation. An imputation in an exchange setting is blocked if there is some set ("coalition") of participants—either a proper subset or the set of all participants—that could achieve a higher payoff for all of its members simply by trading among themselves.

A core imputation is an imputation with the property that is not blocked. The allocation corresponding to a core imputation is a core allocation.

For transferable utility games, every core allocation is efficient, because any inefficient allocation is blocked by the coalition of all participants.

In the particular case of an auction with a single seller, the core is always non-empty, because one core allocation is described by assigning the goods among participants to maximize total value, charging a price to each buyer so that its payoff is zero, and setting the seller's payoff to the total value of the allocation.

Generally, for an auction with a single seller, a feasible, individually rational allocation is a core allocation if and only if there does not exist a set of buyers and an assignment of goods to just that set of buyers, and prices to be paid just by that set of buyers such that the total price paid to the seller is increased and the payoffs to all members of the set is also increased. This description makes precise one of the senses in which the core describes a natural competitive outcome: it describes the outcome of competition among sets of bidders.

The present invention includes design mechanisms that choose core outcomes with respect to reported values and for which equilibrium outcomes are core outcomes with respect to the bidders' actual values, and not just their bids or reports. The connection between selecting the core for reported versus actual values is described in Day and Milgrom (2007).

Simplified Auctions Should be Tight Mechanisms. The economic theory of mechanism design mostly emphasizes the design and use of incentive-compatible direct mechanisms, which are mechanisms according to which participants report all of their information to the operator and are provided incentives to report honestly. According to the revelation principle, any outcome function that can be implemented either in dominant strategies or in Bayesian equilibrium can also be implemented (according to the same equilibrium concept) using an incentive-compatible direct mechanism.

The textbook revelation principle analysis, however, relies on simplifying assumptions that are not always suitable for applications. Thus, Compte and Jehiel (2000), Parkes (2005) and Rezende (2005) have all argued that, contrary to the textbook model, preference formation or reporting is costly and that economizing on those costs favor using sequential mechanisms instead of direct mechanisms. There is an extensive experimental economics literature testing sequential mechanisms in laboratory environments, and the experiments raise a wide range of issues normally suppressed in the standard theory. See, for example, Plott (1997), Goeree, Holt and Ledyard (2007), Goeree and Holt (2008), Kagel, Lien and Milgrom (2009).

Milgrom (2009) takes a different approach to creating simple mechanisms and introduces the notion of tight simplifications. He defines a simplified direct mechanism to be a direct mechanism with a restricted message space (to allow a more compact expression of messages). The outcome function of a simplified mechanism is the restriction of the outcome function of the corresponding extended mechanism to the smaller domain of simplified messages. The extended and simplified mechanisms are called related mechanisms.

A simplification is tight with respect to some class of preferences if for all possible preferences of the participants in that class, the set of pure Nash equilibrium profiles of the simplified mechanism is a subset of the pure Nash equilibrium profiles of the unrestricted ("extended") mechanism and second, that for every positive number epsilon, the same proposition should be true for the sets of "epsilon-equilibria". The reason to focus on tight simplifications, particularly of well-studied mechanism whose equilibrium or epsilon-equilibrium outcomes are satisfactory is to ensure that this is also true of the simplified mechanism.

Milgrom (2009) argues that several well-known auction and matching mechanisms used in practice are tight simplifications of general direct mechanisms. Also, with any positive cost of reporting, some of these simplified direct mechanisms are shown to perform strictly better in Nash equilibrium than the related extended mechanisms. Google's search advertising auction is offered as an example.

The first new message space and simplified mechanism designed with these principles explicitly in mind is described above with reference to FIGS. 1A and 1B. The present invention creates more such message spaces that are well suited for practical applications.

Evidence of Opportunity: Auctions with Simple Budget Constraints. The present invention adds optional budget reporting capabilities to create a new auction to create new auctions that perform much better than existing ones.

The presence of this opportunity hinges on the fact that bidders in large multi-item auctions do often face serious budget constraints. Budgets are used as a control mechanism by corporations, financing institutions, and by the market to limit firms' investments. Even in the multi-billion dollar US radio spectrum auctions, with bids overseen by executives at the highest levels, there is unmistakable evidence that the industry giants enter auctions with a fixed budget. Bulow, Levin and Milgrom (2009) plot the round-by-round total bids of the largest incumbent bidders in several of the largest US spectrum auctions, tracking firms like AT&T, Cingular, Verizon, T-Mobile and Sprint. As prices rise during these auctions, these bidders gradually bid for fewer or smaller licenses, but without reducing the total price of the bids they are placing. They bid just as if there were an overall limit on their authorized spending in these auctions.

According to mechanism design theory, when budget constraints are important for a resource allocation, a proper direct mechanism must accommodate that by allowing bidders to report budget information.

The impact of this particular failure can be illustrated by the case of mineral rights auctions, which we believe also provides an initial commercial opportunity for the present invention. In North America, government sales of mineral rights, especially rights for oil and gas, are most often conducted as simultaneous sealed-bid auctions, with a large numbers of tracts (from dozens to hundreds) commonly offered in a single sale. Such auctions are run by the Department of the Interior in the United States (US) and by several states of the United States and Canadian provincial governments.

Recent mineral rights auctions by the US Department of Interior have had an average of 1.3 bidders per tract. With such limited competition, prices are determined largely by the reserve prices set by government auctioneers. This puts a high value on the expertise, independence and motivation of often low-paid government administrators operating without incentive pay. It is a recipe for failure.

The properties sold in these auctions can be expensive and it appears that some bidders typically enter with limited budgets. These budget constraints limit competition: a bidder with a limited budget cannot afford to place bids on many tracts for fear that too many bids might win. In the example shown below, a game theoretical analysis below shows that this leads to a mixed strategy Nash equilibrium with inefficient outcomes and revenues far below the minimum revenue in the core. In contrast, the present invention that provides an overall budget extension, in which the standard bid can be augmented by an optional budget constraint, leads to competitive (core) outcomes. The non-core outcome in the traditional auction means that there is a losing bidder who is willing to pay more than the price paid by some winning bidder but who was deterred from bidding by the risk of winning too many tracts. A trader might say colloquially that "money was left on the table."

An example illustrates the main point. Suppose that there are just three tracts for sale and four bidders, A1, A2, A3 and B, each of whom bids to buy a single tract. The ratio of bids to tracts in this case is 1.33, which is roughly in accord with the ratio for recent US federal auctions conducted by the Department of Interior. We assume a reserve price of r for each tract.

For a simple game-theoretical analysis, suppose that each tract is worth $r+v_A$ to bidders A1-A3, that these bidders each wish to buy just one tract, and they are sufficiently well coordinated to divide their bids among tracts 1-3 without competing directly. For bidder B, each tract is worth $r+v_B$, where $1/3v_A<v_B<\min(r, v_A)$, and B's budget is equal to this value. We assume that any ties are broken at random and that winning bidders pay the amounts of their winning bids in a classic set of first-price auctions.

There is a unique such Nash equilibrium of this multi-item auction game. In equilibrium, bidder B selects a tract on which to bid, choosing each with probability 1/3. For simplicity in our analysis, we work with "excess bids," that is, a bid is the additional amount offered in excess of the reserve price. All bidders randomize their excess bids over the interval $[0,1/3v_A]$ according to the distributions $$F_A(p)=\frac{v_B-\frac{1}{3}v_A}{v_B-p}\text{ and }F_B(p)=\frac{2v_A}{v_A-p}-2.$$

Notice that the A1-A3 bidders' mixed strategy have atoms at zero; the bid distributions have no other atoms.

To verify the Nash equilibrium, mutual best-response property of this strategy profile, observe that the bidders A1-A3 earn expected profits of $\pi_A=2/3v_A$ for any bid in $[0,1/3v_A]$, bidder B earns $\pi_B=v_B-1/3v_A$ for any bid in $(0,1/3v_A]$, and that bids in excess of $1/3v_A$ all earn less.

The verification of uniqueness of Nash equilibrium follows familiar lines. One first argues that no bidder can play a pure strategy at any Nash equilibrium. Then, following the lines of Griesmer, Levitan and Shubik (1967), one argues that the support of the equilibrium mixed strategies is an interval of bids and that the two bidders for each item randomize over the same interval. The lowest bid by, say, bidder A1 therefore loses whenever B bids for that item and wins otherwise, so the best response condition requires that the lowest (excess) bid must be zero. Indifference by the bidders among the bids in the support of their bid distributions uniquely determine the mixed strategies.

For every realization of the equilibrium randomizations, the Nash equilibrium allocation is outside the core. The failure is sometimes a failure of efficiency. Any core allocation must be efficient, so the tracts must be won by bidders A1-A3. Since bidder B sometimes wins a tract in this equilibrium, the equilibrium is not efficient. And regardless of whether the outcome is efficient, the prices are lower than core prices. In the unique equilibrium, no price is ever more than $r+1/3v_A<v_B$, and prices can be as low as the reserve, r. But the prices in any core allocation must be at least $r+v_B$, for otherwise the seller can replace a winning bidder with bidder B and raise the payoffs of the new trading coalition.

Now consider the extension in which bidders both make bids and, optionally, may also specify a budget constraint. In the new auction, tracts are awarded to maximize the total bid price, subject to the reported budget constraints. Prices for each tract are set equal to the winning bid for that tract. Formally, this mechanism is an extension of the mechanism actually used because if bidders do not specify any budget limits, then the auction reproduces exactly the same results as the currently used auction mechanism.

In the new auction, the previously identified strategy for bidder B is dominated and not an equilibrium strategy. Instead of placing just one bid $b>r$, the bidder would do better to specify a budget limit sufficient to win just one tract and to make bids lower than b on the other tracts. The extra bids create an additional chance of winning an item in case the higher bid fails to win and leads to payoffs that are always as high and that can be strictly higher than the original bids.

What are the Nash equilibria of the new auction? There are many. In the undominated equilibria, bidders A1-A3 all make excess bid $v_B$, for one tract and bidder B randomizes over some lower excess bids on an interval with upper bound $v_B$, in a way that makes the A bids best responses. The auction outcome is efficient, since A1-A3 are the winners. The auction prices, which are all $v_B$, as required for a core allocation. In addition to these Nash equilibria, there are equilibria (in dominated strategies) in which bidders A1-A3 play pure strategies, making excess bids in the open interval $(v_B, v_A)$, and bidder B randomizes in a way that always loses but that makes the others' bids best responses.

What are the Nash equilibria of the new auction? There are many. In the undominated equilibria, bidders A1-A3 all make excess bid $v_B$ for one tract and bidder B randomizes over some lower excess bids on an interval with upper bound $v_B$, in a way that makes the A bids best responses. The auction outcome is efficient, since A1-A3 are the winners. The auction prices, which are all $v_B$, as required for a core allocation. In addition to these Nash equilibria, there are equilibria (in dominated strategies) in which bidders A1-A3 play pure strategies, making excess bids in the open interval ($v_B$, $v_A$), and bidder B randomizes in a way that always loses but that makes the others' bids best responses.

In summary, the unique Nash equilibrium of the commonly used mechanism does not result in core allocations: it occasionally has inefficient goods assignments and always has revenues too low to be consistent with the core. The Nash equilibria of the new mechanism, however, all lead to core allocations: goods assignments are efficient and revenues achieve competitive levels.

In our example, the new auction mechanism preserves the simplicity of the standard mechanism, which is not shared by textbook direct mechanisms. In a setting with n items, a direct mechanism that is not simplified would require that bidders report at least value for each of the $2^n-1$ non-empty subsets of tracts. In actual mineral rights auctions, n is large, so this theoretical issue is also a practical one.

We conclude that the present invention provides an immediate opportunity to incorporate budget constraints in the message spaces of at least one standard auction. As our example illustrates, there are cases in which existing mechanisms perform poorly but a new mechanism with optional budget reports leads to competitive outcomes. The new mechanism is no more demanding on the bidders than the original, for bidders could still make the same bids subject to the same pay-as-bid rules. Most subtly, the mere possibility for bidders to incorporate a budget profoundly changes the strategic interaction, promoting core allocations—efficient assignments with competitive prices for the seller.

Technical Challenges. There are a number of technical hurdles to be overcome in implementing budget-constrained auctions. The hurdles relate to (1) computations, (2) issues of non-transferable utility, (3) the pricing rules to accompany budget-constrained auctions, and (4) ensuring simplicity. All of these pose challenges that must be overcome for the widest application of auction mechanisms with budget reporting.

The first technical challenge concerns computation. In the simple auction mechanism described above, the assignment of goods calls for an optimization that maximizes the total bid, subject to bidder budget constraints. When a bidder may win multiple items, the budget may constrain the allocation even when it does not hold with equality at the optimum. This is very different from the situation in convex problems and highlights the complex, non-convex nature of the optimization.

The computation problem can get worse when the pay-as-bid rule is replaced by some other pricing rule. In some auctions, there is an attempt to commoditize products to set a single uniform price for all goods in a class. Without pay-as-bid pricing, determining whether a particular goods assignment is feasible for a bidder depends on the pricing rule. This adds further computational complexity to what is, even with fixed prices, a kind of knapsack problem, because it fits the maximum bid for multiple items into a fixed budget.

In the mineral rights example recounted above, the particular problem is solved by the present invention by allowing bidders to limit the number of tracts won, rather than limiting their total expenditures. This is an alternate to an overall budget constraint, but is a partial solution to the same problem. The example is special in assuming that all tracts have roughly the same value or reserve price, and the general problem is harder.

A second technical challenge involves extending our analysis to create solutions for "NTU" problems—ones with non-transferable utility. It is fundamental that budget constraints limit transfers, yet most multi-item auction theory relies on assumptions of transferable utility. Among the important exceptions are Gul and Stacchetti (2000) and Ausubel and Milgrom (2002). One important problem here lies in the connection between mechanisms that select core allocations for reported preferences and inducing equilibrium outcomes that are core allocations for actual preferences. The analysis shown above is a successful example: we found that the Nash equilibria of the modified mechanism were all core allocations for the actual preferences. But this finding is not general. As observed by Day and Milgrom (2007), the equilibrium analysis of direct auction mechanisms with bidder budget constraints can be very different from that for the transferable utility case.

In a related vein, budget constraints are known to introduce complementarities in matching problems (Roth, 1986), and that observation applies to auction problems, too. This adds a host of potential issues about combinatorial auctions. See Cramton, Shoham and Steinberg (2006) for a review of the relevant literature.

The third area of technical difficulty is the design of pricing rules. The extensions required to accommodate budget constraints in core-selecting combinatorial auctions appear difficult. While auctions recently used in Ireland and the UK for radio spectrum sales utilize payment rules that select bidder-optimal core allocations as originally proposed by Day and Milgrom (2007), the core of NTU games can have a more complicated structure. Pay-as-bid pricing always selects core allocations, so it is likely that such rules will be used for the initial application of budget-constrained auctions.

Finally, in designing simple auctions, while theory provides guidance, our ultimate goal requires that we create something that is easy for bidders to use. Adding an optional budget report to a standard auction seems to meet that test, but that is an intuitive judgment. Introducing budgets in a way that is easy for even unsophisticated bidders is a key element for the success of our proposed technology.

The invention claimed is:

1. A computer-implemented method for performing a sealed-bid auction of lots on one or more computing devices, the method comprising:

receiving, on the one or more computing devices, a first bid group from a first bidder, the first bid group including a first plurality of bids, and receiving a first budget constraint specifying a total money amount the first bidder can spend for the group in the sealed-bid auction, wherein a sum of the first plurality of bids exceeds the first budget constraint;

receiving, on the one or more computing devices, a second bid group from a second bidder, the second bid group including a second plurality of bids for the sealed-bid auction; and determining, on the one or more computing devices, using the sealed-bid auction of lots, an allocation of lots that awards bids to the first bidder and the second bidder, wherein the allocation maximizes a price for awarded bids, subject to at least the first budget constraint.

2. The computer-implemented method of claim 1, wherein the second bid group includes a second budget constraint specifying a total money amount the second bidder can spend, and wherein determining the allocation is subject to at least the first and the second budget constraints.

3. The computer-implemented method of claim 1, wherein each bid in the first plurality of bids identifies a number of lots of some type and a money value per lot.

4. The computer-implemented method of claim 3 wherein the lot is one from the group of a right, a good, a service, a good and a service, a product, a collection of goods, a collection of services and a collection of goods and a collection of services.

5. The computer-implemented method of claim 1, wherein each bid in the second plurality of bids identifies a number of lots of some type and a money value per lot.

6. The computer-implemented method of claim 1 further comprising:

sending a first message to the first bidder including the allocation; and sending a second message to the second bidder including the allocation.

7. The computer-implemented method of claim 1 wherein the determining the allocation of lots includes modifying a constraint with respect to a single auction to reduce the number of lots a bidder can win.

8. The computer-implemented method of claim 7 further comprising sending a message to the first bidder indicating that a number constraint was added to one of the first plurality of bids in order to honor the first budget constraint.

9. The computer-implemented method of claim 1 wherein the determining the allocation of lots includes:

determining an initial candidate price vector;

determining a first maximum net value, subject to a budget constraint and a market clearing constraint; and determining a second maximum net value minus a net cost of goods at the candidate prices subject to the budget constraint in the market clearing constraint.

10. The computer-implemented method of claim 9 further comprising:

determining whether the first maximum value minus the second maximum value is small;

and if the first maximum value minus the second maximum value is small, outputting the lot prices.

11. The computer-implemented method of claim 9 further comprising: determining whether the first maximum value minus the second maximum value is small; if the first maximum value minus the second maximum value is not small, adjust the prices for goods and repeat the steps of determining the initial candidate price vector, determining the first maximum that value and determining the second maximum net value for the adjusted prices.

12. A computer program product comprising a non-transitory computer usable medium including a computer readable program, wherein the computer readable program when executed on a computer causes the computer to:

receive a first bid group from a first bidder, the first bid group including a first plurality of bids, and receiving a first budget constraint specifying a total money amount the first bidder can spend for the group, wherein a sum of the first plurality of bids exceeds the first budget constraint;

receive a second bid group from a second bidder, the second bid group including a second plurality of bids; and determine using a sealed bid auction of lots, an allocation of lots that awards bids to the first bidder and the second bidder, wherein the allocation maximizes a price for awarded bids, subject to at least the first budget constraint.

13. The computer program product of claim 12, wherein the second bid group includes a second budget constraint specifying a total money amount the second bidder can spend, and wherein the allocation is subject to at least the first and the second budget constraints.

14. The computer program product of claim 12, wherein the computer readable program when executed on the computer causes the computer to also:

send a first message to the first bidder including the allocation; and send a second message to the second bidder including the allocation.

15. The computer program product of claim 12, wherein the determining the allocation of lots includes modifying a constraint with respect to a single auction to reduce the number of lots a bidder can win.

16. The computer program product of claim 12, wherein the computer readable program when executed on the computer causes the computer to also:

determine an initial candidate price vector;

determine a first maximum net value, subject to a budget constraint and a market clearing constraint; and determine a second maximum net value minus a net cost of goods at the candidate prices subject to the budget constraint in the market clearing constraint.

17. A system comprising one or more computing devices for performing an auction of lots in a sealed-bid auction, the system comprising:

an interface module in at least one computing device for receiving a first bid group from a first bidder, the first bid group including a first plurality of bids, receiving a first budget constraint specifying a total money amount the first bidder can spend for the group in the sealed bid auction, wherein a sum of the first plurality of bids exceeds the first budget constraint, the interface module also receiving a second bid group from a second bidder, the second bid group including a second plurality of bids in the sealed bid auction, the interface module coupled to receive the first bid group and the second bid group;

an allocation system in at least one computing device for determining an allocation of lots that awards bids to the first bidder and the second bidder and that maximizes a price for awarded bids, subject to at least the first budget constraint; the allocation system coupled to receive the first bid group and the second bid group from the interface module; and an auction module in at least one computing device for determining using the sealed bid auction of lots and the allocation of lots that awards bids to the first bidder and the second bidder, the auction module coupled to receive the first bid group and the second bid group from the interface module and coupled to receive the allocation from the allocation system and coupled to provide the allocation to the first bidder and the second bidder.

18. The system of claim 17 further comprising an exchange module for operating an exchange to receive bids and send notification messages, the exchange module coupled for communication with the interface module and the auction system.

19. The system of claim 17 wherein the allocation system comprises:

a sellers bid queue for storing bids to sell, the sellers bid queue coupled to the interface module to receive bid groups, and coupled to provide stored bids;

a buyers bid queue for storing bids to buy, the buyers bid queue coupled to the interface module to receive bid groups, and coupled to provide stored bids;

a constraints engine for processing the first bid group and the second bid group from the sellers bid queue and buyers bid queue to determine rules and constraints to determine the allocation of lots and market-clearing prices, the constraints engine coupled to the sellers bid queue and the buyers bid queue; and a bid processor for processing the rules and constraints, the bids from the sellers bid queue and the buyers bid queue to generate a list of winning bids, the bid processor coupled to the sellers bid queue, the buyers bid queue and the constraints engine.

* * * * *